United States Patent
Xue et al.

(10) Patent No.: US 12,081,252 B1
(45) Date of Patent: Sep. 3, 2024

(54) ARCHITECTURE AND ALGORITHM FOR LOW COMPLEXITY TERRESTRIAL INTERFERENCE CANCELLATION

(71) Applicant: Amazon Technologies, Inc., Seattle, WA (US)

(72) Inventors: Feng Xue, Redmond, WA (US); Aditya Chopra, Austin, TX (US); Xiaoyi Wang, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 17/951,611

(22) Filed: Sep. 23, 2022

(51) Int. Cl.
  *H04B 1/10* (2006.01)
  *H04B 7/06* (2006.01)
  *H04B 7/08* (2006.01)

(52) U.S. Cl.
  CPC ......... *H04B 1/1027* (2013.01); *H04B 7/0617* (2013.01); *H04B 7/086* (2013.01)

(58) Field of Classification Search
  CPC .................................................. H04B 1/1027
  USPC ....................................................... 375/267
  See application file for complete search history.

(56) References Cited

U.S. PATENT DOCUMENTS

| | | | | |
|---|---|---|---|---|
| 5,818,729 A | * | 10/1998 | Wang | ................... G06F 30/392 |
| | | | | 716/135 |
| 10,069,587 B1 | * | 9/2018 | Rimini | ................... H04B 1/525 |

* cited by examiner

*Primary Examiner* — Lihong Yu
(74) *Attorney, Agent, or Firm* — Lowenstein Sandler LLP

(57) ABSTRACT

Technologies directed to correcting terrestrial interference using narrowband adaptive filtering and beamforming technology are described. One method includes receiving a first and second radio frequency (RF) signal. The method includes generating first digital samples corresponding to the first RF signal using a first sample rate and generating second digital samples corresponding to the first RF signal using a second sample rate that is lower than the first sample rate. The method further includes generating third digital samples corresponding to the second RF signal using the second sample rate. The method further includes determining parameters associated with a filtering process using the second digital samples and the third digital samples. The method further includes generating fourth digital samples using the parameters of the filtering process. The method further includes removing a first portion from the first RF signal using the first digital samples and the fourth digital samples.

20 Claims, 12 Drawing Sheets

US 12,081,252 B1

ARCHITECTURE AND ALGORITHM FOR LOW COMPLEXITY TERRESTRIAL INTERFERENCE CANCELLATION

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
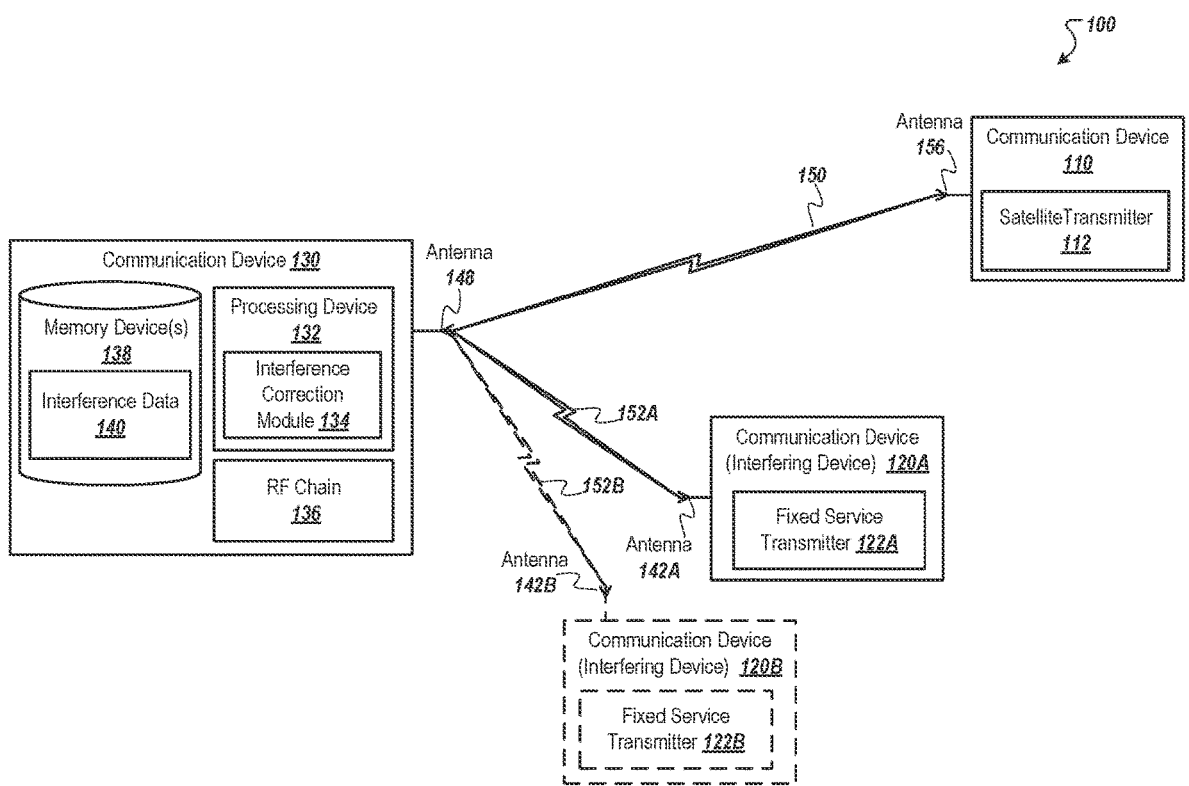
FIG. 1 is a block diagram of a communication system including a communication device with an interference correction module, according to embodiments of the present disclosure.

Technologies directed to canceling terrestrial interference using hybrid beamforming technology are described. Frequency bands 17.7-18.3 GHz, and 19.3-19.7 GHz are commonly shared by fixed service (e.g., Terrestrial) and fixed satellite communication. The Federal Communication Commission (FCC) has granted over 21,000 licenses for fixed service (FS) over the United States territory. The presence of many signals of various communicating entities using overlapping bandwidths across overlapping locations may result in signal interference. For example, communication channels may include a satellite user downlink (e.g., 17.8-18.2 GHz) and a gateway downlink (e.g., 19.3-20.2 GHz). These exemplary communication channels may experience channel interference from the many licensed fixed service communication devices.

Effects of fixed service interference with both user downlink bandwidths and gateway downlinks are experienced differently. Conventionally, gateway site planning typically selects a location free of terrestrial interference. Once the FCC grants a license to a satellite gateway, future operators seeking a license must avoid interfering with the satellite gateway. However, there is often limited professional site planning for customer terminals (CTs) in conventional methodologies. Later, fixed service operators do not need to protect existing CTs that often use a blanket license. The presence of fixed service operators can impose challenges to satellite downlink radio frequency (RF) receiving chains. Conventional satellite receiver designs include RF chains capable for handling noise-limited scenarios. Components of conventional RF chains often employ devices (e.g., low noise amplifiers (LNAs), analog-to-digital converters (ADCs), and automatic gain controllers (AGCs)) with relatively small dynamic ranges. Excessive terrestrial interference may demand a larger dynamic range, which, if resolved by employing different hardware components, can result in significantly increased cost.

Conventionally, fixed service interference can have a relatively large impact (e.g., exceeding the receiver's dynamic range by several dBs). The interference can result in ADC saturation (e.g., the signal is processed outside an operational range of RF chain device (e.g., ADC)), poor signal resolution, and other shortcomings of RF communications. Cancelation of the terrestrial interference, at least in part, can improve the processing of a receive signal (e.g., by reducing the clipping of the ADC). Conventionally, interference cancellations such as spatial domain interference, Zero forcing, minimum mean square error (MMSE), and incremental related carriers (IRC) algorithm are used to minimize the impact of interference on signal-to-noise (SNR). However, all of these identified conventional techniques rely on an accurate channel estimation. For example, if the channel estimation is inaccurate, the cancellation effect may be sub-optimal.

In some conventional solutions, a reference antenna is used to receive the signal from the interference source (sometimes referred to as the "reference signal"), denoted as r(t). The reference signal is sampled at a bandwidth same to (or above) the target signal (sometimes referred to as the "broadband signal" or "satellite signal") bandwidth $W_0$. The digital representation of this sequence may be denoted as $r(nT_0)$ where $T_0$ represents a sampling rate. With $r(nT_0)$, some conventional solutions apply an L-tap adaptive filter with weight w such that a product of the digital samples and the filter weights ($w'r_n$) cancels out the interference signal leaked to the main receiving path of a receiving antenna. For example, $r_n$ may include a signal vector formed by the following:

$$[r(nT_0), r((n-1)T_0), \ldots, r((n-L+1)T_0)], \qquad (1)$$

where L is the total number of samples used in the vector.

The above-described conventional solutions fall short in a few ways. The satellite signal bandwidth may be several hundred MHz (e.g., 400-500 MHz). In the conventional solutions, the filter weight adjustments need to iterate at the same or higher bandwidth as the target satellite signal, which requires iterating at the same or higher bandwidth as the target satellite signal, which requires a high sampling rate resulting in a source of complexity and power drain. Furthermore, the interference bandwidth is typically much smaller than the satellite signal bandwidth. (e.g., 5-30 MHz). Using such differing signal bandwidths results in an interference correlation matrix that is not well-conditioned. For example, popular matrix-solving algorithms (e.g., linear mean square (LMS)) encounter convergence and stability issues. Traditional second-order adaptive filtering methods (e.g., recursive least squares (RLS) or direct minimum mean square error (MMSE) solutions) provide solutions at the cost of increased complexity. For example, the second-order adaptive filtering method typically requires the maintenance of large correlation matrices, resulting in many costly multiplication and division operations.

Aspects of the present disclosure overcome the deficiencies of conventional interference corrections systems and methods. The methods, devices, and systems described herein provide novel solutions for canceling out interference to a wide-band ground satellite receiver from a narrow band fixed service link. The present disclosure provides an architecture that employs an adaptive filter to work and update in the narrow band with a much slower update frequency and a much shorter number of filter taps, saving overall complexity and power. Aspects of the present disclosure provide an architecture that further minimizes the correlation in the input signals from the interference source when sampling at high bandwidth, leading to a well-conditioned correlation matrix and faster/stable convergence when performing cancellation operations. Aspects of the present disclosure further describe mechanisms to adaptively change filter update step size with special triggers from the satellite system. Aspects of the present disclosure employ algorithms (e.g., recursive-linear-square) that are simpler than the traditional use of formerly used concepts.

Some advantages of the present disclosure include providing a system, method, and/or device with lower computational complexity than conventional interference correction technologies. Conventional technology often employs dense covariance matrixes of the channel communication requiring computationally demanding data preprocessing procedures dependent on knowledge of the channel interference. For example, in the described fixed service interference situation, the specific band the interference resides in, and its bandwidth is often commonly known. Given this, the disclosed architecture can focus on the particular band by shifting in frequency or band-pass filtering so that the adaptive filtering algorithm works in that particular band. The embodiments and aspects of the present disclosure can improve conditions of the input correlation matrix, which can resemble a full-band white noise. The interference signal can further be processed with a much lower sampling rate.

In an exemplary embodiment, a user terminal (UT) includes beamforming circuitry coupled to an array antenna and a reference antenna. The UT further includes a processing device coupled to the beamforming circuitry and the reference antenna. The processing device receives a first radio frequency (RF) signal via the beamforming circuitry. The first RF signal includes (i) a first portion corresponding to a first frequency band and (ii) a second portion corresponding to a second frequency band. The second frequency band is narrower than and included within the first frequency band. The processing device further generates first digital samples by sampling the first RF signal using a first sample rate corresponding to the first frequency band. The processing device further generates second digital samples by sampling the first RF signal using a second sample rate corresponding to the second frequency band and slower than the first sample rate. The processing device receives a reference RF signal via the reference antenna. The reference RF signal corresponds to the second frequency band. The processing device further generates third digital samples by sampling the reference RF signal using the second sampling rate. The processing device determines weights of an adaptive filtering technique using the second digital samples and the third digital samples. The adaptive filtering technique uses an update rate corresponding to the second sample rate. The processing device generates fourth digital samples using a combination of the weights, the second digital samples, and the third digital samples. The fourth digital samples correspond to the first sampling rate. The processing device further removes at least a selection of the second portion from the first RF signal by combining the first digital samples with the fourth digital samples.

In some embodiments, adaptive filtering logic (e.g., adaptive filtering algorithms and/or techniques) is discussed throughout the various embodiments of the present disclosure. An adaptive filter is a system with a filter (e.g., linear filter) that has a transfer function controlled by variable parameters and a means to adjust those parameters according to an optimization algorithm. Adaptive filters update parameters over time as further input is received. In embodiments, adaptive filtering logic may include a linear mean square (LMS) algorithm and/or a recursive least squares (RLS) algorithm. The adaptive filtering logic may include an update rate indicative of a duration for carrying out an iteration for determining filter parameters. For example, the update rate may be dependent on a number of samples of a given signal to which filter parameters are being determined. The update rate may be dependent on sample density and iteration determination logic complexity. In embodiments using LMS, the adaptive filter utilizes a step size $\mu$ corresponding to an update rate of the filter weights and/or parameters.

In another exemplary embodiment, a method includes receiving a first RF signal and a second RF signal. The method further includes generating first digital samples corresponding to the first RF signal using a first sampling rate. The method further includes generating second digital samples corresponding to the first RF signal using a second sampling rate that is lower than the first sampling rate. The method further includes generating third digital samples corresponding to the second RF signal using the second sampling rate. The method further includes determining parameters associated with a filtering process using the second digital samples and the third digital samples. The method further includes generating fourth digital samples using the parameters of the adaptive filtering technique. The fourth digital samples correspond to the first sampling rate. The method further includes removing a first portion from the first RF signal using the first digital samples and the fourth digital samples.

In another exemplary embodiment, a communication device includes radio frequency front end (RFFE) circuitry coupled to an array antenna, a memory coupled to the RFFE circuitry, and a controller coupled to the RFFE circuitry and the memory. The controller receives, using the RFFE circuitry, a first RF signal and a second RF signal. The controller generates first digital samples corresponding to the first RF signal using a first sample rate. The controller generates second digital samples corresponding to the first RF signal using a second sample rate, slower than the first sample rate. The controller generates third digital samples of the second RF signal using the second sample rate. The controller determines parameters of an adaptive filtering technique using the second digital samples and the third digital samples. The adaptive filtering technique uses an update rate corresponding to the second sample rate. The controller generates fourth digital samples using the parameters of the adaptive filtering technique, the second digital samples, and the third digital sample. The fourth digital samples correspond to the first sampling rate. The controller removes a first portion from the first RF signal by combining the first digital samples with the fourth digital samples.

FIG. 1 is a block diagram of a communication system 100 including a communication device with interference correction module 134, according to embodiments of the present disclosure. Communication system 100 includes communication devices 110, 120A-B, and 130. Communication device 110 may transmit signals (e.g., using satellite transmitter 112 or more generally an RF signal transmitter). Communication device 110 may be in an artificial satellite and include one or more satellite communication elements (e.g., discussed further in FIGS. 8-12). The satellite transmitter 112 may include signal transmission devices (e.g., digital beamforming (DBF) circuitry, analog beamforming (ABF) circuitry) to generate and transmit a signal 150 (e.g., satellite downlink, fixed service transmission) to communication device 130. The signal 150 may correspond to a satellite downlink and/or uplink.

As shown in FIG. 1, communication system 100 includes one or more communication device(s) 120A-B (e.g., an interfering device). Communication device(s) 120A-B may include fixed service transmitter(s) 122A-B that sends signal(s) 152A-B that interfere with signals 150 from communication device 130. The fixed service transmitter(s) 122A-B may include signal transmission devices (e.g., digital beamforming (DBF) circuitry and analog beamforming (ABF) circuitry to generate and transmit signal(s) 152A-B (e.g., fixed service transmission) to communication device 130. The signal 150 may correspond to a satellite downlink and/or uplink. In some embodiments, more than communication device(s) 120A-B may interfere with signal 150 from communication device 110.

In some embodiments, communication devices 110, 120A-B, and 130 utilize the Wi-Fi® or IEEE 802.11 standard protocol. In other embodiments, the wireless connections may use some other wireless protocol, such as the current 3rd Generation Partnership Project (3GPP) long term evolution (LTE) or time division duplex (TDD)-Advanced systems. Communication devices 110, 120A-B, and 130 may each include one or more antennas, receivers, transmitters, or transceivers that are configured to utilize a wireless local area network (WLAN) protocol, such as the Wi-Fi® or IEEE 802.11 standard protocol, other radio protocols, such as 3GPP LTE, or TDD-Advanced, or any combination of these or other communications standards. In one embodiment, the wireless communications between communication devices 110, 120A-B, and 130 may utilize the same Wi-Fi® or IEEE 802.11 standard protocol or other protocols such as Bluetooth®, ZigBee, near field communications (NFC), or other protocols capable of communicating digitally encoded signal (e.g., cyclostationary digitally encoded RF signals).

Communication devices 110, 120A-B, and 130 can include one or more directional or omnidirectional antennas (e.g., antenna 148, antenna 156, antenna(s) 142A-B), including, for example, dipole antennas, monopole antennas, patch antennas, loop antennas, microstrip antennas, or other types of antennas suitable for transmission of radio frequency (RF) signals. In some embodiments, instead of two or more antennas, a single antenna with multiple apertures may be used. In these embodiments, each aperture may be considered a separate antenna. In some embodiments, communication devices 110, 120A-B, and 130 may utilize multiple-input multiple-output (MIMO) circuits and/or methodology. For example, antennas may be effectively separated to utilize spatial diversity and the different channel characteristics that may result between each of the antennas and the antennas of a transmitting station. In some MIMO embodiments, antennas may be separated by up to 1/10 of a wavelength or more.

In some embodiments, communication device 110 generates digitally encoded RF signals using one or more digital modulation schemes. In embodiments, communication device 110 leverages orthogonal frequency-division multiplexing (OFDM) to generate signal 150. OFDM is a digital multi-carrier modulation scheme that extends the concept of single subcarrier modulation by using multiple subcarriers within the same single channel. Rather than transmit a high-rate stream of data with a single subcarrier, OFDM makes use of a large number of closely-spaced orthogonal subcarriers that are transmitted in parallel. Each subcarrier is modulated with a conventional digital modulation scheme (such as quadrature phase shift keying (QPSK), 16QAM, etc.) at a symbol rate, $T_s$. However, the combination of many subcarriers enables data rates similar to conventional single-carrier modulation schemes within equivalent bandwidths.

In some embodiments, communication device 110 leverages quadrature amplitude modulation (QAM) to generate signals 150. QAM includes a signal in which two carriers are shifted in phase by 90 degrees (e.g., sine and cosine) and are modulated and combined. As a result of the phase difference, the phase-shifted carriers are in quadrature one with the other. Each of the signals includes a symbol rate, $T_s$, associated with a rate (e.g., frequency), the digital symbols occur within the QAM signal.

As shown in FIG. 1, communication device 130 receives signals 150 and signal(s) 152A-B from communication device 110 and communication device(s) 120A-B, respectively. Communication device 130 includes processing device 132, memory device 138, and RF chain 136. The RF Chain 136 (e.g., antennas, ABF, low-noise amplifier (LNA), automatic gain controller (AGC), analog-to-digital converter (ADC), digital beamforming (DBF) device, etc. as will be discussed further in later embodiments) processes the received signals (e.g., directs analog and digital beamforming components, converts the signal to a digital representation, and processing the digital information) to produce digital samples of the received signal. As shown in FIG. 1, communication device 130 includes one or more processing devices 132, such as one or more CPUs, microcontrollers, field programmable gate arrays, or other types of processors. Processing device 132 processing the digital samples. Processing device 132 implements the interference correction module 134.

Communication device 130 includes one or more processor(s) (e.g., processing device 132), such as one or more CPUs, microcontrollers, field programmable gate arrays, or other types of processors. Communication device 130 also includes system memory 138, which may correspond to any combination of volatile and/or non-volatile storage mechanisms. The system memory 138 stores information that provides operating system components, various program modules, program data, and/or other components. In one embodiment, the system memory 138 stores instructions of methods to control the operation of the communication device 130. The electronic device 130 performs functions by using the processor(s) (e.g., processing device 132) to execute instructions provided by the system memory 138. For example, memory device(s) 138 may store interference data 140. Interference data 140 may indicate a mapping of locations of interfering device(s). Interference data 140 may further include data associated with an adaptive filtering algorithm, such as storing parameters, weights, sampling rates, update step sizes, and the like.

Interference detection module 136 includes an adaptive filter to work and update in a narrow band (e.g., corresponding to the interfering device) with a much slower update frequency and much shorter number of filter taps than the operating frequency of antenna 148, saving overall complexity and power. The interference detection module 136 uses an adaptive filter with slower update frequency to minimize the correlation in the input signals from the interference source (e.g., communication device(s) 120A-B) when sampling at high bandwidth, leading to a well-conditioned correlation matrix and faster/stable convergence in cancellation. In some embodiments, the interference detection model 136 adaptively changes filter update step size with a special trigger from the satellite system (e.g., communication device 110) and employs algorithms (recursive-linear-square) that are simpler in complexity than conventional adaptive filtering algorithms used in conventional systems. Further details of the interference correction module 134 are discussed in FIGS. 2-7.

Although communication system 100 is illustrated as having several separate functional elements, one or more of the functional elements may be combined and may be implemented by combinations of software configured elements, such as processing elements including digital signal processors (DSPs), and/or other hardware elements. For example, some elements can include one or more microprocessors, DSPs, application-specific integrated circuits (ASICs), radio-frequency integrated circuits (RFICs), and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
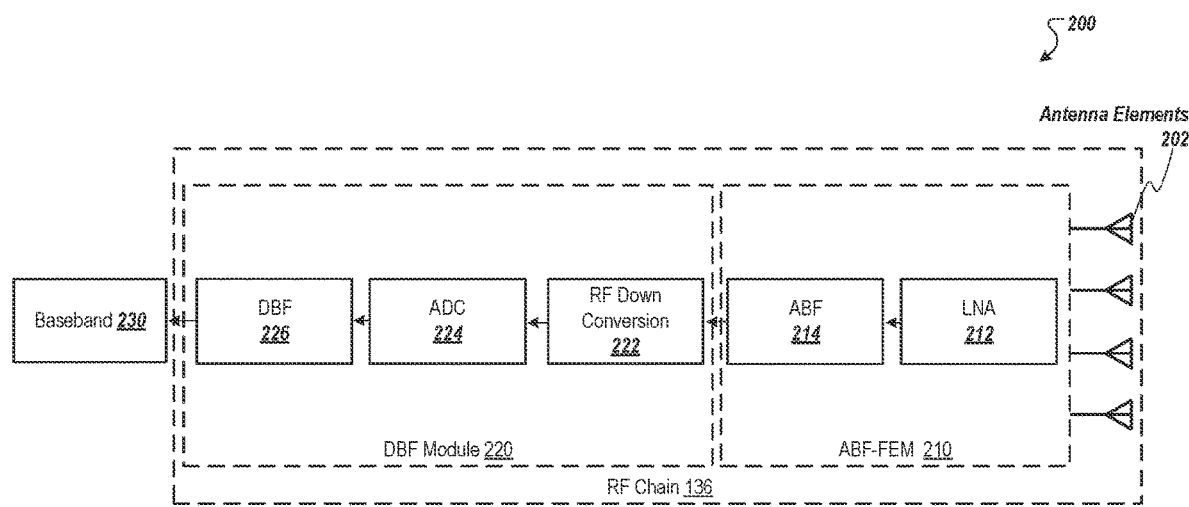
FIG. 2 is a functional diagram of a communication device with analog beamforming (ABF) circuitry and digital beamforming (DBF) circuitry, according to embodiments of the present disclosure.

FIG. 2 is a functional diagram of a communication device 200 with analog beamforming (ABF) circuitry and digital beamforming (DBF) circuitry, according to embodiments of the present disclosure. The communication device 200 includes an RF chain 136 that includes antenna elements 202, analog beamforming-front end module (ABF-FEM) 210, and digital beamforming (DBF) module 220. Antenna elements 202 are coupled to ABF-FEM 210, such as through RF ports. The ABF-FEM 210 includes a low noise amplifier (LNA) 212 and an ABF device 214. The LNA amplifies a low-power signal without significantly degrading the signal-to-noise (SNR) ratio. The ABF device 214 includes phase shifters that shift portions of received signal beams to align a phase of the received signal (e.g., signals received from the antenna elements 202) and combiners to combine the phase-aligned portions of the signal. The use of various power amplification values and phase shifter can effectively steer a receive beam of the antennas. For example, the antenna elements may be divided into multiple groups of distinct phases (e.g., four groups of antennas). It should be noted that FIG. 2 is a simplified illustration and that components of ABF device 214 (e.g., phase shifters) may not be directly coupled to the RF ports.

The ABF-FEM 210 is coupled to DBF module 220. DBF Module 220 includes an RF down conversion unit 222 coupled to ADC 224 and the DBF device 226. Phase shifters can be implemented in a digital domain of the DBF device 226. The phase shifters are coupled to a combiner. The combiner and phase shifters can be processing elements of the DBF device 226, such as a discrete component, a discrete circuit, logic circuitry, a digital functional block, a programmable block, a digital signal processing (DSP) functional block, or the like.

In some embodiments, a signal beam is received across an antenna array by antenna elements 202. The signal beam is transmitted through RF ports to ABF-FEM 210. To arrive at the antenna elements 102, the incoming signal beam can include variable path lengths to reach individual antenna elements 102 of the antenna array. The signal beam can be a primary beam made up of several subbeams that may or may not arrive from the safe direction. For example, subbeams of a signal beam propagating at 45 Degrees from nadir relative to the surface of the antenna array travel further to reach antenna elements 202 on a far side of the antenna array than to reach antenna elements on a near side of the antenna array relative to the incoming signal beam. The variable path length may result in the antenna elements 202 receiving the incoming signal beam in various phases across the antenna array. Each phase shifter receives subbeams of the signal from an associated antenna element 102. A phase shifter applies a phase shift to the subbeams of the incoming signal. For example, phase shifters may apply a relative phase shift to each subbeam such that each signal of the total incoming signal is realigned to be in phase. The relative phase shift may be associated with the variable path length of the signal across each of the antenna elements 202. The relative phase shift for an individual phase shifter 108 may be associated with the spatial location of an associated antenna element 202 of the antenna array. In some embodiments, the relative phase shift applied by the phase shifters may be associated with or coordinated with a time delay applied by ABF 214 and/or 226.

The RF chain using beamforming components such as ABF and DBF use various antenna gain patterns having various weighting values for signal process elements such as phase shifter, signal amplifier, processing filters, etc. The antenna gain pattern may result in a receive beam or a distribution of sensitivities resulting in a main lobe, side lobe, and signal minimums across the various direction from the array antenna. The various direction may be defined relative to a bearing angle of the array antenna. The bearing angle may be associated with a direction normal from a surface (or more generally a plane) of the array antenna. The various antenna gain patterns can effectively steer the main lobe, side lobes, and signal minimums to be directed at various angles by adjusting the various weighting of the signal process elements, as discussed above.

In some embodiments, a phase shifter 108 is associated with multiple antenna elements 202. For example, DBF device 226 and/or ABF device 214 may include one phase shifter coupled to receive signals from multiple antenna elements 102. As noted above, the phase shifter is not necessarily coupled to an antenna element 102. For example, there can be a down-conversion chain, including an analog-to-digital converter, before a signal gets to the phase shifter. Each phase shifter may shift the phase of signals received by multiple antenna elements 202. In another example, a DBF device 226 and/or ABF 214 may include a phase shifter for each antenna element 202 such that each phase shifter is associated only with an individual antenna element 202 of the antenna array.

In some embodiments, a combination of phase shifter values, amplifier values may be associated together into a weighted combination of values that effectively steer a beam (e.g., main lobes, side lobes, signal minimum points). For example, a main lobe may be pointed at a target communication device and/or an offset of the target communication device. In radio electronics, a signal minimum may include a direction in an antenna's radiation pattern where the antenna radiates or combines signals to almost no radio waves. For example, the far-field signal strength is a local minimum. Signal minimums occur because different parts of an array antenna radiate radio waves of different phases resulting in constructive and destructive interference leading to lobes and spatial signal minimums.

The received signal may be phase-compensated both by the ABF device 214 and the DBF device 226 to generate the baseband signal 230. The DBF module 220 and the ABF-FEM 210 may direct beams independent of each other (e.g., a digital beamforming direction and an analog beamforming direction). As described herein, signal interference may result in the DBF module experiencing a saturation condition (e.g., ADC 224 clipping) when a signal is received in a given direction. Steering the analog receive beam (e.g., by ABF 214) to a different angle may result in the saturation condition being remedied (e.g., the saturation condition is no longer present). In some embodiments, the beam direction is controlled across two dimensions. For example, the analog beam may be directed along an elevation angle (e.g., relative to a horizon) and an azimuthal angle (e.g., parallel to the horizon).

In some embodiments, the DBF module includes multiple DBF chains (e.g., multiple ADCs). The saturation condition may occur when one of the ADC experiences saturation (e.g., clipping). In other embodiments, the saturation condition may correspond to a threshold number (e.g., threshold quantity) of ADCs experiencing saturation. Saturation generally refers to when the received signal power of the ADC operates outside an operational range of the ADC.

FIGS. 3-7 depict spatial beamforming interference correction processes 300-800, according to embodiments of the present disclosure.

Figure 3:
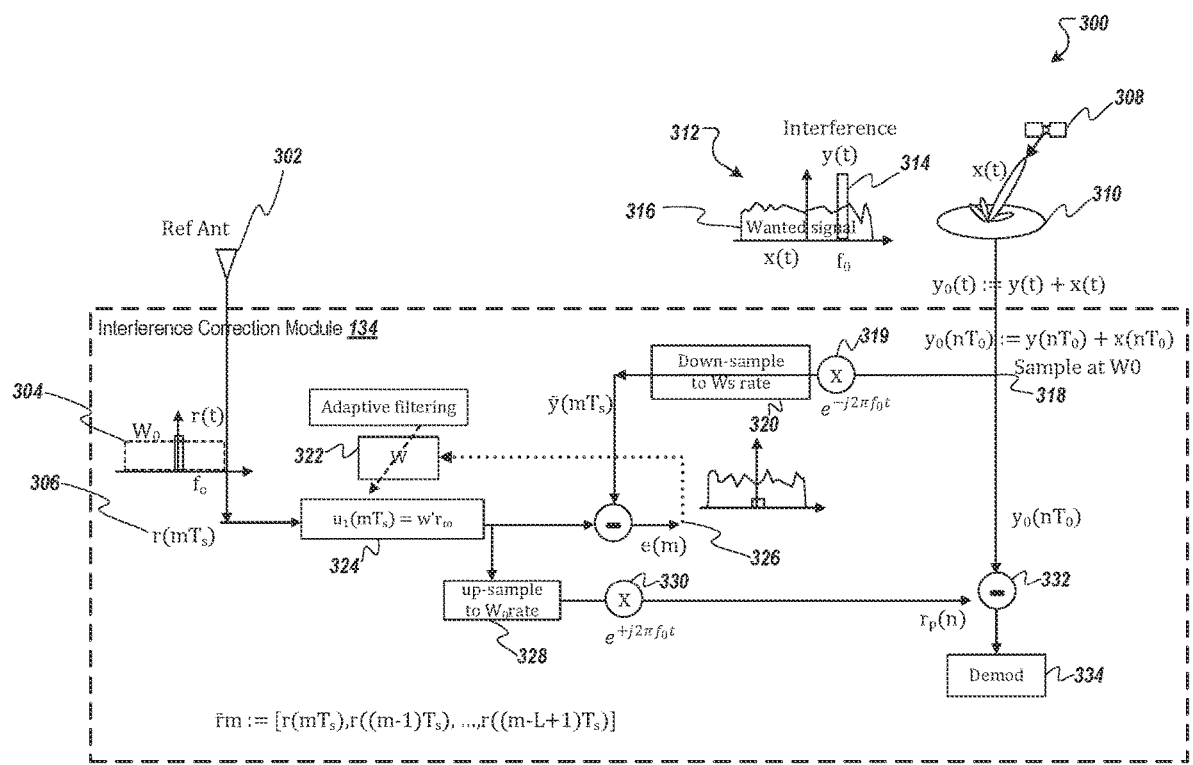
FIGS. 3-7 depict spatial beamforming interference correction processes, according to embodiments of the present disclosure.

FIG. 3 illustrates a spatial beamforming interference correction process 300. In some embodiments, one or more aspects of FIG. 3 may be performed and/or carried out by interference correction module 134 (of FIG. 1). As shown in FIG. 3, a narrowband signal 304 is received at reference antenna 302. The narrowband signal may include (e.g., at least a portion of the signal) a fixed-service transmission. The reference signal may be received when a target communication device 308 (e.g., a satellite) is not transmitting. However, in some embodiments, the reference signal 304 is received while the target communication device 308 is transmitting, and the reference antenna 302 is configured to only receive signals within a determined narrowband associated with the interfering frequency band. The narrowband signal or reference signal, r(t), has a center frequency, $f_0$, with a bandwidth, $W_s$. The narrowband signal is sampled (at junction 306) at a sample rate, $T_s$, associated with the bandwidth $W_s$.

As shown in FIG. 3, beamforming circuitry 310 receives an RF signal 312 that includes a first portion 316, x(t), and a second portion 314, y(t). The second portion 314 may be substantially equivalent (e.g., within a margin of error (e.g., noise)) to the reference signal 304. The first portion 316 of RF signal 312 may include a first frequency band having a first bandwidth (e.g., 500 MHz). The second portion 314 of RF signal 312 may include a second frequency band having a second bandwidth (e.g., 50 MHz). The second frequency band may be narrower (e.g., smaller bandwidth) than the first frequency band. The second frequency band may be included within the first frequency band.

As shown in FIG. 3, the RF signal 312 (e.g., $y_0(t):=y(t)+x(t)$) may be sampled (at junction 318) at a sampling rate associated with the bandwidth (e.g., $W_0$) of the RF signal 312. Processing logic and/or a controller may generate digital samples (e.g., $y_0(nT_0):=y(nT_0)+x(nT_0)$), where $T_0$ represents a sampling period). A digital frequency shifter 319 (e.g., $e^{-j2\pi f_0 t}$, where $f_0$ represents a center frequency of the second portion 314 of the RF signal 312) is multiplied by the received signal (e.g., $y_0(t)$) which has been sampled at a sampling rate associated with the bandwidth (e.g., $W_0$). In some embodiments, frequency shifter 319 shifts the center frequency to a relative center (e.g., center of the first frequency band).

As shown in FIG. 3, the digital shifted receive signal, $y_0(nT_0)e^{-j2\pi f_0 nT_0}$, is downsampled (at 320) at a rate less than the first sampling rate, $W_s<W_0$. In some embodiments, $W_0$ is a multiple of $W_s$, (e.g., $W_s \cdot K = W_0$). The resampling when the sampling rates are integer multiples of one another can allow for processing logic to simply retain the $K^{th}$ samples of the sequence without performing further operation (e.g., no need for a low-pass filter). For example, if the satellite signal bandwidth is 500 MHz while the interference signal is 50 MHz, then only every $10^{th}$ signal is kept. In embodiments where $W_0$ is not a multiple of $W_s$, a low-pass filter may be employed, such as in a classical resampling procedure. Using low sampling rate inputs to the adaptive filtering 322 (sometimes referred to as adaptive filtering technique or adaptive filtering algorithm) can allow for the adaptive filtering to operate at a frequency (e.g., step size and update rate) associated with the narrowband interfering bandwidth $W_s$.

The adaptive filtering logic 322 adjusts the filter weight w(t) and runs at a frequency similar to the interference's bandwidth $W_s$ (effectively saving complexity and power over higher frequencies). The use of adaptive filtering 322 is to minimize an error 326, e(m), representative of the signal interference. Processing logic generates digital samples based on a combination (e.g., product) of samples of the reference signal (at junction 306) and weights of the adaptive filtering 322. These digital samples generated by the filter weight (e.g., estimation of the interference) are up-sampled 328 to the satellite signal frequency $W_0$ and then frequency shifted 330 to the return position. For example, using a second digital frequency shifter (e.g., $e^{+j2\pi f_0 nT_0}$) related to the first digital frequency shifter ($e^{-j2\pi f_0 nT_0}$). At 332, the resulting signal (e.g., up-sampled, digitally return shifted) is used in combination with digital samples of the first signal sampled at the higher bandwidth $W_0$. The combination effectively cancels at least a portion of the interfering signal from the first RF signal resulting in a demodulated fixed-serviced-interference free signal 334.

Figure 4:
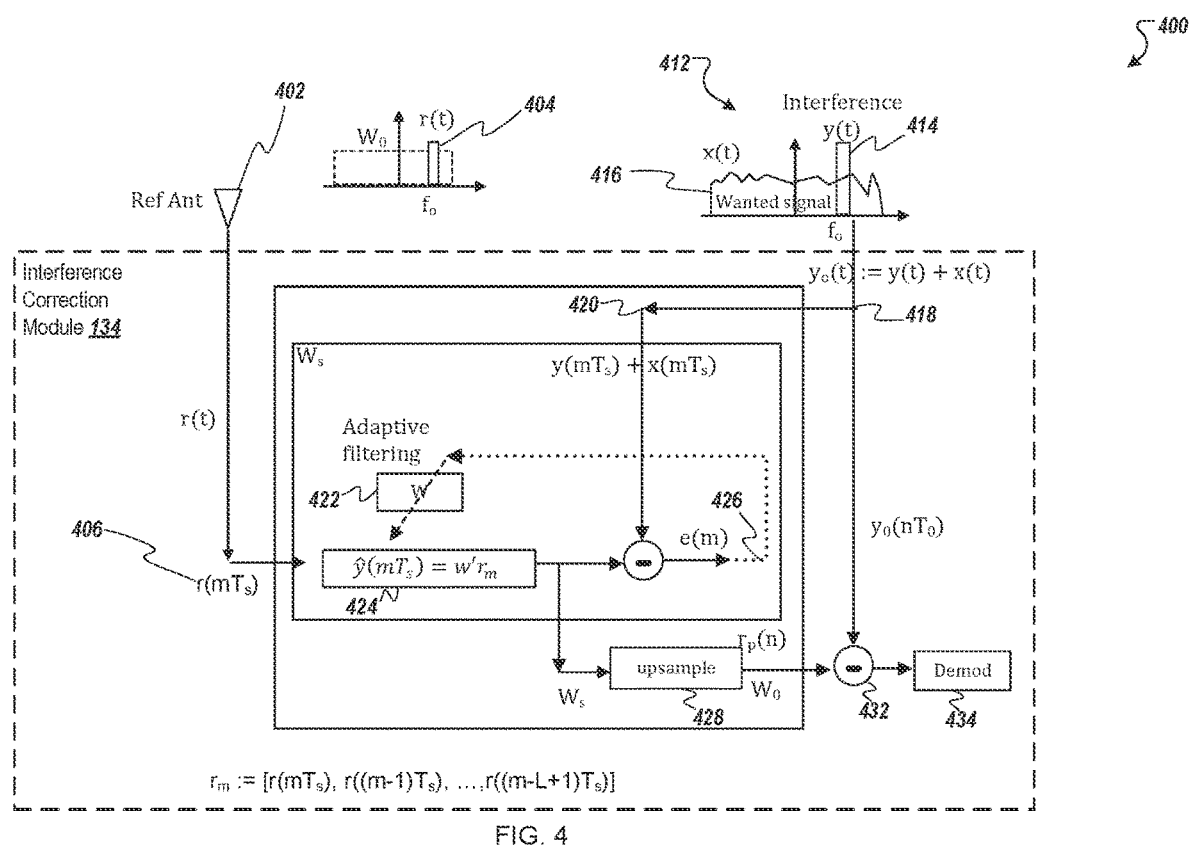

FIG. 4 illustrates a spatial beamforming interference correction process 400. In some embodiments, one or more aspects of FIG. 4 may be performed and/or carried out by interference correction module 134 of FIG. 1. As shown in FIG. 4, a narrowband signal 404 is received at reference antenna 402. The narrowband signal 404 may include (e.g., at least a portion of the signal) a fixed-service transmission. The reference signal may be received when a target communication device (e.g., a satellite) is not transmitting. However, in some embodiments, the reference signal 404 is received while the target communication device 408 is transmitting, and the reference antenna 402 is configured to only receive signals within a determined narrowband associated with the interfering frequency band. The narrowband signal or reference signal, r(t), has a center frequency, $f_0$, with a bandwidth, $W_s$. The narrowband signal is sampled (at junction 406) at a sample rate, $T_s$, associated with the bandwidth $W_s$.

As shown in FIG. 4, beamforming circuitry 410 may receive an RF signal 412 that includes a first portion 416 and a second portion 414. The second portion 414 may be substantially equivalent (e.g., within a margin of error (e.g., noise)) to the reference signal 404.

The first portion 416 of RF signal 412 may include a first frequency band having a first bandwidth (e.g., 500 MHz). The second portion 414 of RF signal 412 may include a second frequency band having a second bandwidth (e.g., 50 MHz). The second frequency band may be narrower (e.g., smaller bandwidth) than the first frequency band. The second frequency band may be included within the first frequency band.

As shown in FIG. 4, the RF signal 412 (e.g., $y_0(t):=y(t)+x(t)$) may be sampled (at junction 418) at a sampling rate associated with the bandwidth (e.g., $W_0$) of the RF signal 412. Processing logic and/or a controller may generate digital samples (e.g., $y_0(nT_0)$ $y(nT_0)+x(nT_0)$), where $T_0$ represents a sampling period).

As shown in FIG. 4, the first RF signal 412 is sampled, $y_0(nT_0)$, at a rate less than the first sampling rate, $W_s < W_0$. In some embodiments $W_0$ is a multiple of $W_s$, (e.g., $W_s \cdot K = W_0$). The digital samples are sampled at the second sampling rate for processing logic to retain the $K^{th}$ samples of the sequence without performing further operation (e.g., no need for a low-pass filter). For example, if the satellite signal bandwidth is 500 MHz while the interference signal is 50 MHz, then only every $10^{th}$ signal is kept. In embodiments where $W_0$ is not a multiple of $W_s$, a low-pass filter may be employed, such as in a classical resampling procedure. Using low sampling rate inputs to the adaptive filtering 422 (sometimes referred to as adaptive filtering technique or adaptive filtering algorithm) can allow for the adaptive filtering at a frequency (e.g., step size and update rate) associated with the narrowband interfering bandwidth $W_s$.

The adaptive filtering logic 422 adjusts the filter weight w(t) and runs at a frequency similar to the interference's bandwidth $W_s$, effectively saving complexity and power over higher frequencies. The use of adaptive filtering 422 is to minimize an error 426, e(m), representative of the signal interference. Processing logic generates digital samples based on a combination (e.g., product) of samples of the reference signal (at junction 406) and weights of the adaptive filtering 422. These digital samples generated by the filter weight (e.g., estimation of the interference) are up-sampled 428 to the satellite signal frequency $W_0$. At block 432, the resulting signal (e.g., up-sampled) is used in combination with digital samples of the first signal sampled at the higher bandwidth $W_0$. The combination effectively cancels at least a portion of the interfering signal from the first RF signal resulting in a demodulated fixed-serviced-interference free signal 434.

Figure 5:
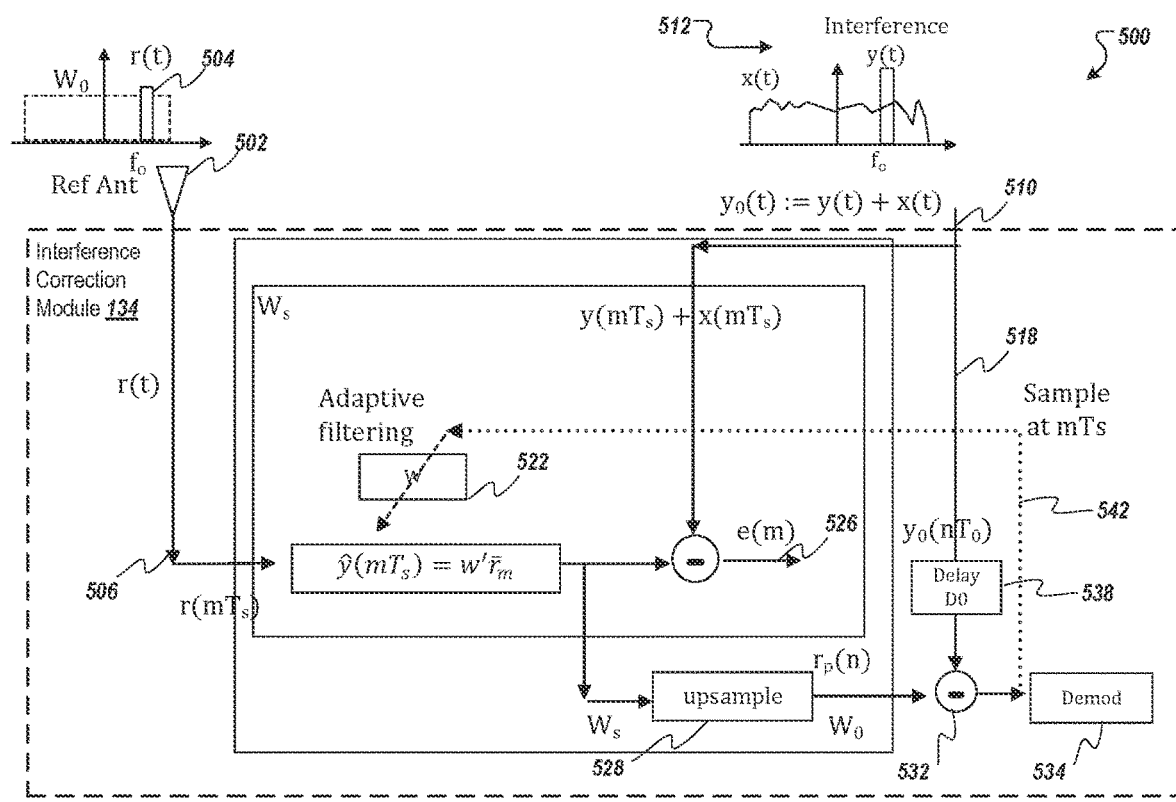

FIG. 5 illustrates a spatial beamforming interference correction process 500. In some embodiments, one or more aspects of FIG. 5 may be performed and/or carried out by interference correction module 134 of FIG. 1. As shown in FIG. 5, a narrowband signal 504, r(t), is received at the reference antenna 502. The narrowband may include (e.g., at least a portion of the signal) a fixed-service transmission. The reference signal may be received when a target communication device (e.g., a satellite) is not transmitting. However, in some embodiments, the reference signal 504 is received while the target communication device is transmitting, and the reference antenna 502 is configured to only receive signals within a determined narrowband associated with the interfering frequency band. The narrowband signal or reference signal, r(t), has a center frequency, $f_0$, with a bandwidth, $W_s$. The narrowband signal is sampled (at junction 506) at a sample rate, $T_s$, associated with the bandwidth $W_s$.

As shown in FIG. 5, beamforming circuitry (at 510) may receive an RF signal 512 that includes a first portion 516, x(t), and a second portion, y(t). The second portion, y(t) may be substantially equivalent (e.g., within a margin of error (e.g., noise)) to the reference signal 404, r(t). The first portion of RF signal 412 may include a first frequency band having a first bandwidth (e.g., 500 MHz). The second portion of RF signal 412 may include a second frequency band having a second bandwidth (e.g., 50 MHz). The second frequency band may be narrower (e.g., smaller bandwidth) than the first frequency band. The second frequency band may be included within the first frequency band.

As shown in FIG. 5, the RF signal 512 (e.g., $y_0(t):=y(t)+x(t)$) may be sampled (at junction 418) at a sampling rate associated with the bandwidth (e.g., $W_0$) of the RF signal 512. Processing logic and/or a controller may generate digital samples (e.g., $y_0(nT_0)$ $y(nT_0)+x(nT_0)$), where $T_0$ represents a sampling period).

As shown in FIG. 5, the RF signal 512 signal, $y_0(nT_0)$, is further sampled at a rate less than the first sampling rate, $W_s < W_0$. In some embodiments $W_0$ is a multiple of $W_s$, (e.g., $W_s \cdot K = W_0$). The resampling when the sampling rates of integer multiples of one another can allow for processing logic to simply retain the $K^{th}$ samples of the sequence without performing further operation (e.g., no need for a low-pass filter). For example, if the satellite signal bandwidth is 500 MHz while the interference signal is 50 MHz, then only every $10^{th}$ signal is kept. In embodiments where $W_0$ is not a multiple of $W_s$, a low-pass filter may be employed, such as in a classical resampling procedure. Using low sampling rate inputs to the adaptive filtering 522 (sometimes referred to as adaptive filtering technique or adaptive filtering algorithm) can allow for the adaptive filtering at a frequency (e.g., step size and update rate) associated with the narrowband interfering bandwidth $W_s$.

The adaptive filtering 522 adjusts the filter weight w(t) and runs at a frequency similar to the interference's bandwidth $W_s$, which can, for example, save complexity and power over higher frequencies. The use of adaptive filtering 522 is to minimize an error 526, e(m), representative of the signal interference. Processing logic generates digital samples based on a combination (e.g., product) of samples of the reference signal (at junction 506) and weights of the adaptive filtering 522. These digital samples generated by the filter weight (e.g., estimation of the interference) are up-sampled (at 528) to the satellite signal frequency $W_0$. At 532, the resulting signal (e.g., up-sampled, digitally return shifted) is used in combination with digital samples of the first signal sampled at the higher bandwidth $W_0$. The combination effectively cancels at least a portion of the interfering signal from the first RF signal resulting in a demodulated fixed-serviced-interference free signal 534.

In some embodiments, the up-sampling (at 528) may result in the signals entering the junction at 532 being out of phase from each other. A delay component 538, $D_0$, may be employed on either branch entering junction 528 such that corresponding samples of the up-sampled digital signal align with corresponding samples of the digital samples sampled at a sample rate associated with the bandwidth of the RF signal 512. For example, the delay component may include a selection of phase shifter and/or time delay components. A feedback loop is provided to indicate to the adaptive filtering component the demodulated signal 534. The adaptive filtering component 522 further adapts (e.g., updates) one or more parameters (e.g., weights) based on the information received through the feedback loop 542.

Figure 6:
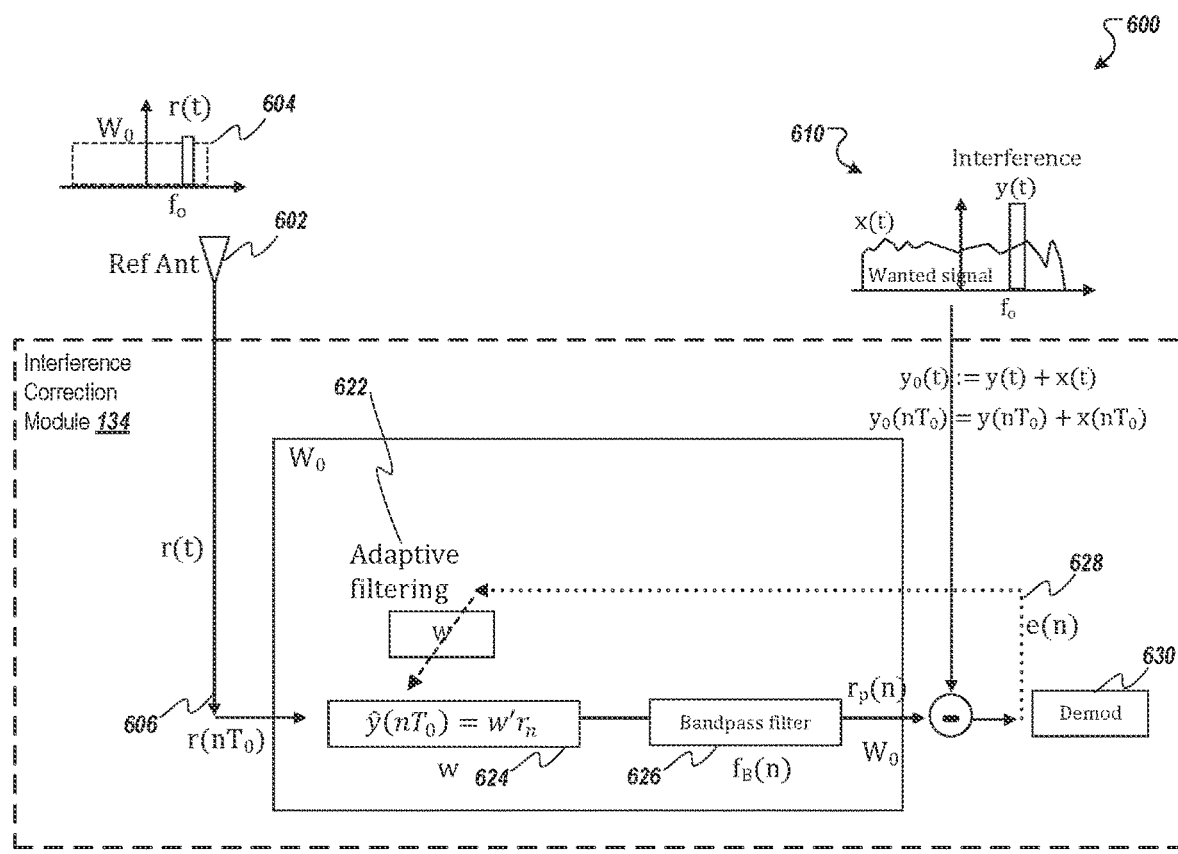

FIG. 6 illustrates a spatial beamforming interference correction process 600. In some embodiments, one or more aspects of FIG. 6 may be performed and/or carried out by interference correction module 134 of FIG. 1. As shown in FIG. 6, a narrowband signal 604, r(t), is received at reference antenna 602. The narrowband may include (e.g., at least a portion of the signal) a fixed-service transmission. The reference signal may be received when a target communication device (e.g., a satellite) is not transmitting. However, in some embodiments, the narrowband signal 604 (e.g., reference signal) is received while the target communication device is transmitting, and the reference antenna 602 is configured to only receive (e.g., filtering signals outside the target narrowband of the reference signal) signals within a determined narrowband associated with the narrowband frequency band. The narrowband signal or reference signal, r(t), has a center frequency, $f_0$, with a bandwidth, $W_s$.

The interference correction module 134 receives a broadband signal 610 (e.g., using beamforming circuitry as described in association with FIG. 2). The broadband signal 610 includes a narrowband portion y(t) and a broadband portion x(t). The broadband signal 610 and the narrowband signal 604 are sampled using a sampling rate $T_0$ associated with a bandwidth, $W_0$ of the broadband signal 610.

The narrowband signal 604 is sampled ($r(nT_0)$ at 606) at a sample rate, To, associated with the bandwidth $W_0$, of the broadband signal 610. The digital samples at 606 are used as input to adaptive filtering logic 622. The adaptive filtering logic 622 determines weighting parameters 624 ($y(nT_0) = w'r_n$). The weighting parameters 624 are provided to a bandpass filter 626, which targets signals outside the frequency of the narrowband signal 604, corresponding to the digital samples of the weighting parameters 624. The resulting digital samples from the bandpass filter 626 are combined with digital samples of the broadband RF signal 610 sampled at the broadband sampling rate $T_0$ associated with the broadband bandwidth $W_0$. The resulting demodulated signal 630 mitigates or otherwise removes (e.g., cancels) the second portion (narrowband y(t)) from the broadband RF signal 610. The interference correction module 134 includes a feedback loop 628 that includes the error signal e(n). The error signal 626 is provided to the adaptive filtering logic 622, which further updates the weighting parameters 624.

In some embodiments, the adaptive filtering logic 622 generates an estimation of the interference in the RF signal. The adaptive filtering logic 622 includes a simple adaptive filter convoluted with a band-pass filter. The adaptive filtering logic 622 updates the weighting parameters 624 with a frequency corresponding to the interference bandwidth $W_s$, while the convoluted filters effectively work at the interference correction modules receive frequency $W_0$. Mathematically, the filter can be represented with non-zero energy in a certain band B as $f(n)=f_B(n)*w(n)$, where f(n) represents a filter with non-zero energy in band B (e.g., the band where the interference exists). The $f_B(n)$ is a bandpass filter with a passband of B, and w(n) is a filter with much fewer taps than f(n). Instead of trying to find the optimal filter f(n), which has a large number of taps, an optimal filter w(n) is employed, which has fewer taps. Given w(n), it is easy to derive the consequent f(n) since the band pass filter $f_B(n)$ is known in advance. The number of taps allocated to w(n) and the bandpass filter $f_B(n)$ can be determined based on the strength and spectral dynamics of the interference signal in a way that optimizes the overall interference cancellation performance. For example, if the interference signal exhibits frequency selectivity in its band, additional taps can be allocated to w(n) at the expense of $f_B(n)$, making the band pass filter a little wider. And vice versa, if the interference signal is flat, employing fewer taps in w(n) results in a sharper band pass filter that will cause less error leakage into the communication signals outside the interference band.

Figure 7:
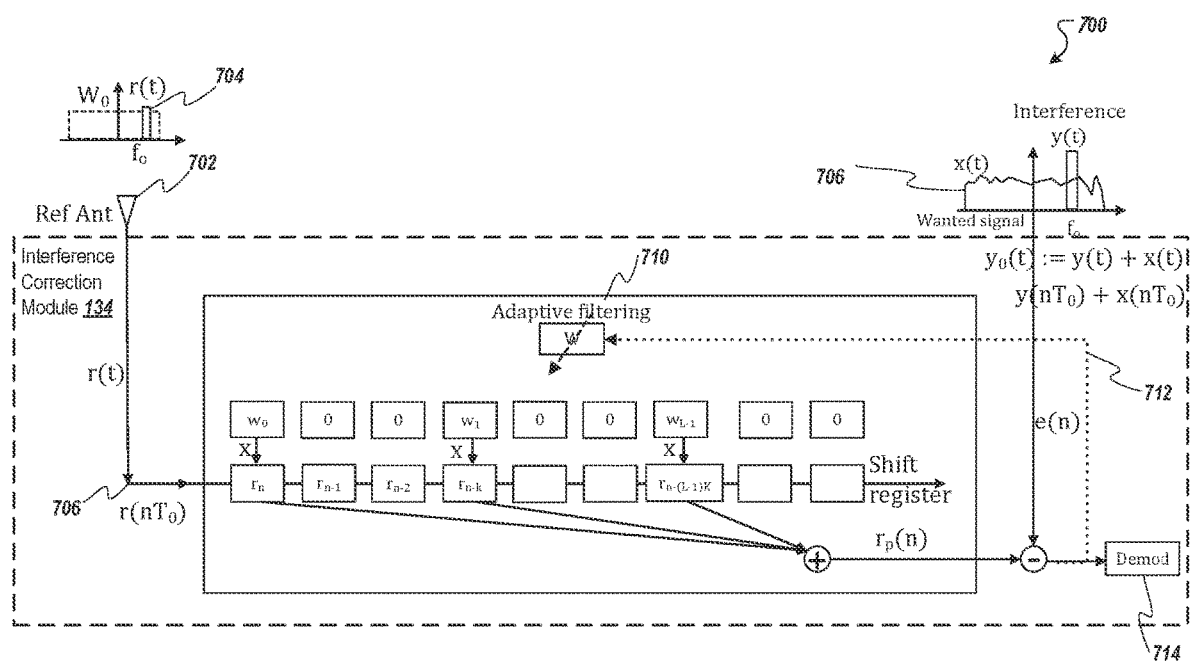

FIG. 7 illustrates a spatial beamforming interference correction process 700. In some embodiments, one or more aspects of FIG. 7 may be performed and/or carried out by interference correction module 134 of FIG. 1. As shown in FIG. 7, a narrowband signal 704 (sometimes referred to as the "interference signal"), r(t), is received at reference antenna 602. The narrowband may include (e.g., at least a portion of the signal) a fixed-service transmission. The reference signal may be received when a target communication device (e.g., a satellite) is not transmitting. However, in some embodiments, the narrowband signal 704 (e.g., reference signal) is received while the target communication device is transmitting, and the reference antenna 702 is configured to only receive (e.g., filtering signals outside the target narrowband of the reference signal) signals within a determined narrowband associated with the narrowband frequency band. The narrowband signal or reference signal, r(t), has a center frequency, $f_0$, with a bandwidth, $W_s$.

The interference correction module 134 further receives a broadband signal. The narrowband signal and the broadband signal are each sampled at a sampling rate of the broadband signal, $W_0$.

In some embodiments, the interference signal resides in a narrower band $W_s$. The interference correction module 134 can model an interference leakage channel using a linear-time-invariant (LTI) system, with a sampling rate $W_s$. The LTI system may be executed using adaptive filtering logic 710. The interference correction module 134 may exclude an up-sampling filter (e.g., as used in other embodiments). by filtering the maintaining weights of the adaptive filtering logic 710 that corresponds to individual samples of a lower sampling rate associated with the narrowband signal 704. For example, adaptive filter weights $w_0, w_1, \ldots w_{L-1}$ may be associated with sampling varying by a particular split or step size. For example, if $W_s \cdot K = W_0$, where K is an integer, then every $K^{th}$ sample (the same architecture can be applied for a K close to $W_0/W_s$) of the digital samples (e.g., every $K^{th}$ shift register) will be paired with a weight value while others remain unchanged In some embodiments, in operation, the shift register operates at each $T_0$. The adaptive filtering logic 710 shifts the signals one block to the right. The adaptive filtering logic 710 then multiple the weights $w_0, w_1, \ldots, w_{L-1}$ to derive $r_p(n)$. The signals not corresponding to w will be ignored (e.g., equivalently multiple by 0).

The resulting product (e.g., dot product) of the weighting values and the digital samples of the narrowband signal results in digital samples sampled in the broadband sampling rate $T_0$. The resulting digital samples from the adaptive filtering logic 710 are combined with digital samples of the broadband RF signal 706 sampled at the broadband sampling rate $T_0$ associated with the broadband bandwidth $W_0$. The resulting demodulated signal 714 mitigates or otherwise removes (e.g., cancels) the second portion (narrowband y(t)) from the broadband RF signal 706. The interference correction module 134 includes a feedback loop 712 that includes the error signal e(n). The error signal is provided to the adaptive filtering logic 710, which further updates the weighting parameters.

Adaptive filtering logic (e.g., adaptive filtering algorithms and/or techniques) is discussed throughout the various embodiments of the present disclosure. An adaptive filter is a system with a filter (e.g., linear filter) that has a transfer function controlled by variable parameters and a means to adjust those parameters according to an optimization algorithm. Adaptive filters update parameters over time as further input is received. In embodiments, adaptive filtering logic may include a linear mean square (LMS) algorithm and/or a recursive least squares (RLS) algorithm.

In embodiments using LMS, the adaptive filter utilizes a step size y corresponding to an update rate of the filter weights and/or parameters. For example, the LMS algorithm may be represented by $w(n+1)=w(n)+\mu e(n)'r_n$, where $e(n)=y_0(n)-w(n)'r_n$, and $r_n$ is the input signal column vector formed by $[r(nT_0), \ldots, r((n-L+1)T_0)]$. In some embodiments, a two-step system is employed where a first step size is larger than a second step size: $\mu_1 > \mu_2 > 0$.

The first step size is applied at the beginning of the weight adaption. After a certain number of steps, the second step size is applied with smoother and stable changes. The transition between the two-step size is triggered by the communication device based on the direction of the receive beam of beamforming circuitry of the communication device. In some embodiments, a transition between the first update step size and the second update step size is determined based on a receive beamforming vector changing. In some embodiments, a transition between the first update step size and the second update step size is triggered when a sidelobe of an antenna gain directed towards a fixed interference device significantly changes direction. For example, the communication device. For example, the communication device may store data (e.g., within a database) that indicates when a beamforming change leads to a significate interference change. In some embodiments, more than two step sizes may be used.

For example, three step sizes may be used, four step sizes may be used, five step sizes may be used, and so on.

In embodiments using the RLS algorithm, the adaptive filter tries to find the weight w(n) to minimize the following objective function: $\Sigma_{j=0}^{n}\lambda^{n-j}|y_0(j)-w(n)'r_j|^2$ which can be simplified to a mean square error problem using the following equation: $R(n)w(n)=\beta(n)$, where R(n) is the covariance matrix of input signals while $\beta(n)$ is the correlation between input and output. Solving this equation leads to a complexity of $O(L^3)$, where L is the dimension of the filter. In classical RLS algorithm, the solution is computed recursively with complexity $O(L^2)$. This involves maintaining and updating the inverse of the input signals covariance matrix P(n) of dimension L×L, and w(n) is computed as $P(n)\beta(n)$.

In some embodiments, a direct form of the covariance matrix R can be employed. At time n−1, an approximate solution of w(n−1) may be determined for the equation: $R(n-1)w(n-1)=\beta(n-1)$. The remainder vector may be defined as $\eta(n-1):=\beta(n-1)-R(n-1)\hat{w}(n-1)$ wherein $\Delta R(n):=R(n)-R(n-1)$, and $\Delta\beta(n):=\beta(n)-\beta(n-1)$, which can be computed at time n. Then at time n, one can determine $\Delta w(n)$ as follows steps. Step 0: Initialize $\eta(-1)=0$, $\beta(-1)=0$, $\hat{w}(-1)=0$ for For n=0, 1, .... Step 1: Find $\Delta R(n)$ and $\Delta\beta(n)$. Step 2 $\beta_0(n):=\eta(n-1)+\Delta\beta(n)-\Delta R(n)\hat{w}(n-1)$. Step 3: Solve $R(n)\Delta w=\beta_0(n) \rightarrow \Delta w(n), \eta(n)$. Step 4: $\hat{w}(n)=\hat{w}(n-1)+\Delta w(n)$. Here Step 1 and Step3 incur most of the complexity. In Step1, processing logic needs to maintain the correlation matrix update. In tapped-delay-line systems, the matrix R is Toeplitz, and processing logic only needs to update and maintain L variables in each step.

In some embodiments, step 3 may be simplified using various approximations. In some embodiments, coordinate descent logic may be leveraged such that step 3 is not solved but is simplified to the dominant term $\beta_0(n)$ at each step. In some embodiments, conjugate gradient logic may be employed to perform a line search towards the largest descent direction. In some embodiments, dichotomous coordinate descent (DCD) logic may be employed. For example, the following DCD methodology may be used. The method may include specifying $\Delta w$'s range to be in [−H, H] represented with Mb bits and further specifying a number of iterations Nu. The method further includes initializing the following values: $\Delta w=0$, $\eta=\beta_0$, $\alpha=H$, $q=0$. The method proceeds through the following logical loop:

For $m = 1, \ldots, Mb$ $s1.\ \alpha = \alpha/2$ $s2.\ \text{Flag} = 0$ $s3.\ \text{For } k = 1, \ldots, L$ $\quad\text{If} |\eta_k| > \left(\frac{\alpha}{2}\right) R_{k,k}, \text{ then}$ $\quad\quad (\Delta w)_k = (\Delta w)_k + \text{sign}(\eta_k)\alpha$ $\quad\quad \eta = \eta - \text{sign}(\eta_n)\alpha R^{(k)}$ $\quad\quad q = q + 1, \text{flag} = 1$ $\quad\quad \text{If } q > Nu, \text{ stop the algorithm.}$ $S4.\ \text{If flag} = 1, \text{ then repeat from step } s2$ Where $(\Delta w)_k$ is $\Delta w$'s k-th component, $r_k$ is r's k-th component, $R^{(k)}$ is R's k-th column and $R_{k,k}$ is R's element at (k, k).

In the above algorithm, the number of additions is no more than $L*(2Nu+Mb-1)+Nu$, and there is no multiplication or division. When combining the simplifications of Step 1 and Step 3, the overall complexity of the DCD algorithm is O(L) multiplications in each step. This is in the same order as LMS.

Figure 8:
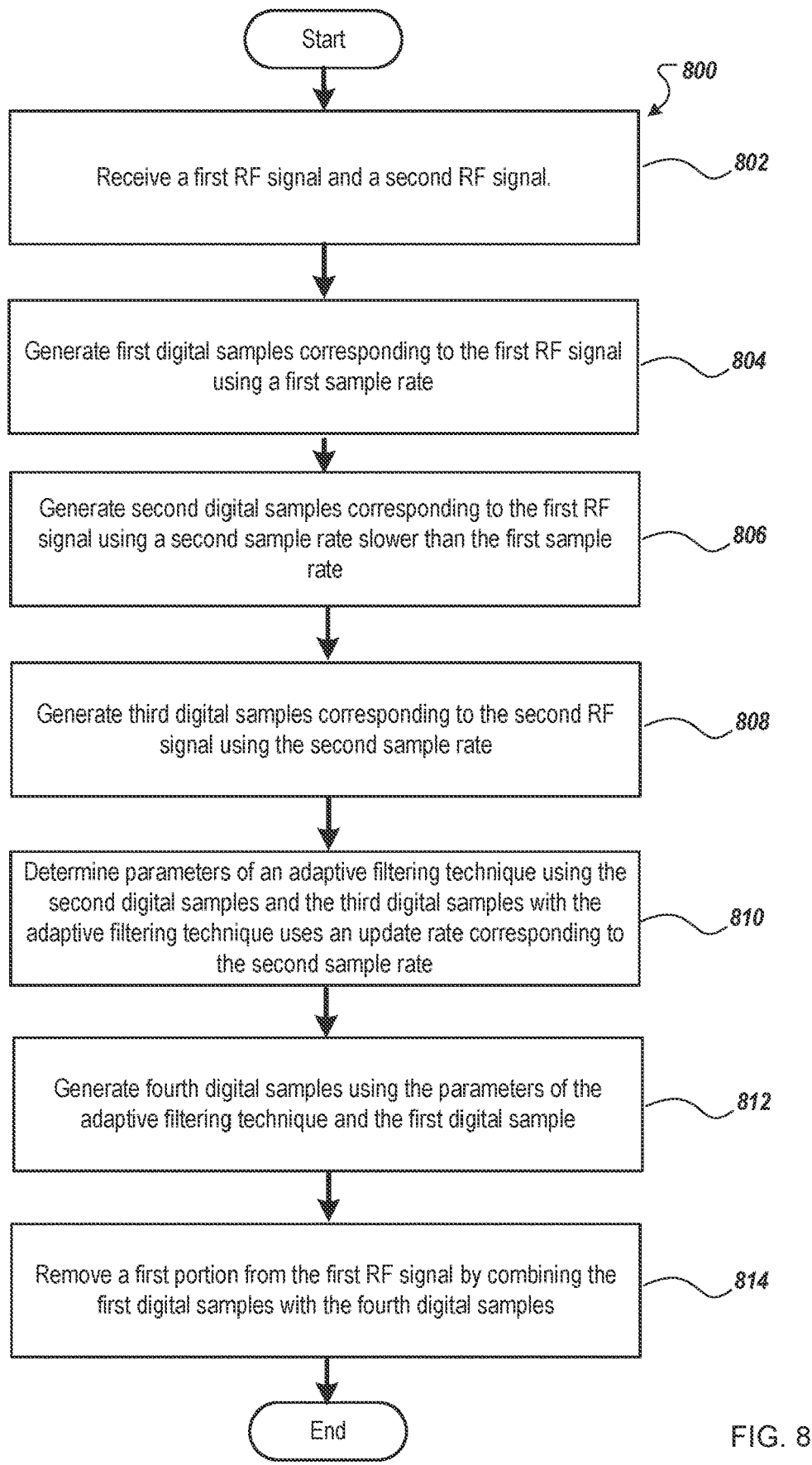
FIG. 8 is a flow diagram of a method for spatial beamforming interference correction, according to embodiments of the present disclosure.

FIG. 8 is a flow diagram of a method 800 for spatial beamforming interference correction, according to embodiments of the present disclosure. Method 800 may be performed by processing elements that may comprise hardware (circuitry, dedicated logic, etc.), software (such as executing on a general purpose computer system or a dedicated machine), or any combination thereof. In one implementation, method 800 is performed on communication device 130 using processing device 132 of FIG. 1, while in some other implementations, one or more blocks of FIG. 8 may be performed by one or more other machines not depicted in the figures.

At block 802, processing logic receives a first RF signal and a second RF signal. The first RF signal may include a broadband signal with a first broadband portion and a second narrowband portion. The broadband portion may be a received signal from a target communication device (e.g., an artificial satellite), and the second narrowband portion corresponds to a fixed-service interference device. The second RF signal is a reference signal (e.g., received by a reference antenna). The first RF signal may be received using beamforming circuitry with a first antenna gain pattern directed in a first direction towards the target communication device. The second portion of the RF signal corresponds to a frequency band that is narrow and included with a frequency band corresponding to the first portion of the RF signal.

At block 804, processing logic generates first digital samples corresponding to the first RF signal using a first sample rate. The first sample rate is associated with a bandwidth of the first RF signal (e.g., 500 MHz), specifically the first broadband portion of the first RF signal. At block 806, processing logic generates second digital samples corresponding to the first RF signal using a second sample rate slower than the first sample rate. The second sample rate is associated with a bandwidth of the second portion of the first RF signal (and further the reference signal). At block 808, processing logic generates third digital samples corresponding to the second RF signal using the second sample rate. In some embodiments, the first sample rate is an integer multiple of the second sample rate.

In some embodiments, the first digital samples are digitally shifted using a digital shifter such that a center frequency of the second portion of the first RF signal is moved to a central position relative to the first portion of the first RF signal At block 808, processing logic determines parameters of an adaptive filtering technique using the second digital samples and the third digital with the adaptive filtering technique using an update rate corresponding to the second sample rate. The adaptive filter technique is a system with a filter (e.g., linear filter) that has a transfer function controlled by variable parameters and a means to adjust those parameters according to an optimization algorithm. Adaptive filters update parameters over time as further input is received. In embodiments, adaptive filtering logic may include a linear mean square (LMS) algorithm and/or a recursive least squares (RLS) algorithm.

At block 810, processing logic generates fourth digital samples using the parameters of the adaptive filtering technique and the first digital samples.

In some embodiments, the fourth digital samples are generated by applying a bandpass filter that filters a combination of samples of the third digital samples and corresponding parameters of the adaptive filtering technique. The bandpass filter can include a pass band corresponding to the second frequency band. In some embodiments, the fourth digital samples are generated by further applying a second digital frequency shift. The second digital frequency shift is associated with the first digital frequency shift.

In some embodiments, wherein the fourth digital samples are generated by up-sampling a combination of samples of the third digital samples and corresponding parameters of the adaptive filtering technique. Processing logic further applies a relative time delay to the first digital samples.

At block 812, processing logic removes a first portion from the first RF signal by combining the first digital samples with the fourth digital samples. In some embodiments, combining the first digital samples with the fourth digital samples results in corresponding samples of the first digital samples being in phase with corresponding samples of the fourth digital samples.

In some embodiments, the first RF signal is received with beamforming circuitry configured with an antenna gain pattern with a main lobe oriented along a first direction. Processing logic further determines a radio frequency (RF) interference condition based on the first RF signal, wherein the RF interference condition is associated with an interfering device disposed along a second direction. Processing logic further determines a transition between a first update step size of the adaptive filter technique and a second update step size of the adaptive filter technique based on the RF interference condition.

Figure 9:
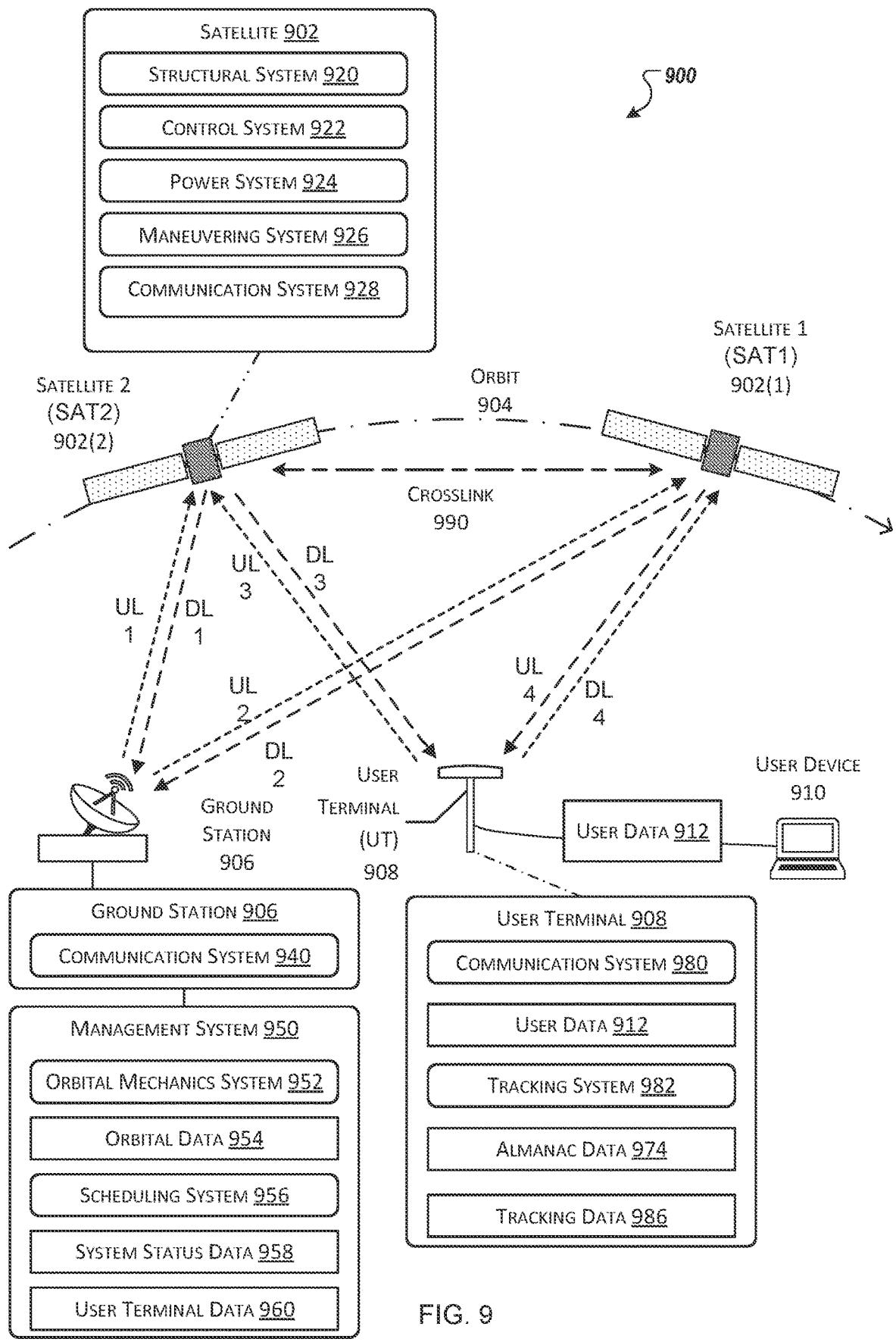
FIG. 9 illustrates a portion of a communication system that includes two satellites of a constellation of satellites, each satellite being in orbit, according to embodiments of the present disclosure.

FIG. 9 illustrates a portion of a communication system 900 that includes two satellites of a constellation of satellites 902(1), 902(2), ..., 902(S), each satellite 902 being in orbit 904 according to embodiments of the present disclosure. The system 900 shown here comprises a plurality (or "constellation") of satellites 902(1), 902(2), ..., 902(S), each satellite 902 being in orbit 904. Any of the satellites 902 can include the communication system 100 of FIG. 1 or communication device 200 of FIG. 2 and other array antennas and receiving (Rx) and/or transmission (Tx) DBF devices described herein. Also shown is a ground station 906, a user terminal (UT) 908, and a user device 910.

The constellation may comprise hundreds or thousands of satellites 902, in various orbits 904. For example, one or more of these satellites 902 may be in non-geosynchronous orbits (NGOs) in which they are in constant motion with respect to the Earth. For example, the orbit 904 is a low earth orbit (LEO). In this illustration, orbit 904 is depicted with an arc pointed to the right. A first satellite (SAT1) 902(1) is leading (ahead of) a second satellite (SAT2) 902(2) in the orbit 904.

The satellite 902 may comprise a structural system 920, a control system 922, a power system 924, a maneuvering system 926, and a communication system 928. In other implementations, some systems may be omitted, or other systems added. One or more of these systems may be communicatively coupled with one another in various combinations.

The structural system 920 comprises one or more structural elements to support the operation of the satellite 902. For example, the structural system 920 may include trusses, struts, panels, and so forth. The components of other systems may be affixed to or housed by the structural system 920. For example, the structural system 920 may provide mechanical mounting and support for solar panels in the power system 924. The structural system 920 may also provide for thermal control to maintain components of the satellite 902 within operational temperature ranges. For example, the structural system 920 may include louvers, heat sinks, radiators, and so forth.

The control system 922 provides various services, such as operating the onboard systems, resource management, providing telemetry, processing commands, and so forth. For example, the control system 922 may direct the operation of the communication system 928.

The power system 924 provides electrical power to operate the components onboard the satellite 902. The power system 924 may include components to generate electrical energy. For example, the power system 924 may comprise one or more photovoltaic cells, thermoelectric devices, fuel cells, and so forth. The power system 924 may include components to store electrical energy. For example, the power system 924 may comprise one or more batteries, fuel cells, and so forth.

The maneuvering system 926 maintains the satellite 902 in one or more of a specified orientation or orbit 904. For example, the maneuvering system 926 may stabilize the satellite 902 with respect to one or more axis. In another example, the maneuvering system 926 may move the satellite 902 to a specified orbit 904. The maneuvering system 926 may include one or more computing devices, sensors, thrusters, momentum wheels, solar sails, drag devices, and so forth. For example, the sensors of the maneuvering system 926 may include one or more global navigation satellite system (GNSS) receivers, such as global positioning system (GPS) receivers, to provide information about the position and orientation of the satellite 902 relative to Earth. In another example, the sensors of the maneuvering system 926 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 928 provides communication with one or more other devices, such as other satellites 902, ground stations 906, user terminals 908, and so forth. The communication system 928 may include one or more modems, digital signal processors, power amplifiers, antennas (including at least one antenna that implements multiple antenna elements, such as a phased array antenna, an embedded calibration antenna, processors, memories, storage devices, communications peripherals, interface buses, and so forth. Such components support communications with other satellites 902, ground stations 906, user terminals 908, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 928 may be output to other systems, such as the control system 922, for further processing. Output from a system, such as the control system 922, may be provided to the communication system 928 for transmission.

One or more ground stations 906 are in communication with one or more satellites 902. The ground stations 906 may pass data between the satellites 902, a management system 950, networks such as the Internet, and so forth. The ground stations 906 may be emplaced on land, on vehicles, at sea, and so forth. Each ground station 906 may comprise a communication system 940. Each ground station 906 may use the communication system 940 to establish communication with one or more satellites 902, other ground stations 906, and so forth. The ground station 906 may also be connected to one or more communication networks. For example, the ground station 906 may connect to a terrestrial fiber optic communication network. The ground station 906 may act as a network gateway, passing user data 912 or other data between the one or more communication networks and the satellites 902. Such data may be processed by the ground station 906 and communicated via the communication system 940. The communication system 940 of a ground station may include components similar to those of the communication system 928 of a satellite 902 and may perform similar communication functionalities. For example, the communication system 940 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 906 are in communication with a management system 950. The management system 950 is also in communication, via the ground stations 906, with the satellites 902 and the UTs 908. The management system 950 coordinates the operation of the satellites 902, ground stations 906, UTs 908, and other resources of the system 900. The management system 950 may comprise one or more of an orbital mechanics system 952 or a scheduling system 956. In some embodiments, the scheduling system 956 can operate in conjunction with an HD controller.

The orbital mechanics system 952 determines orbital data 954 that is indicative of a state of a particular satellite 902 at a specified time. In one implementation, the orbital mechanics system 952 may use orbital elements that represent characteristics of the orbit 904 of the satellites 902 in the constellation to determine the orbital data 954 that predicts location, velocity, and so forth of particular satellites 902 at particular times or time intervals. For example, the orbital mechanics system 952 may use data obtained from actual observations from tracking stations, data from the satellites 902, scheduled maneuvers, and so forth to determine the orbital elements. The orbital mechanics system 952 may also consider other data, such as space weather, collision mitigation, orbital elements of known debris, and so forth.

The scheduling system 956 schedules resources to provide communication to the UTs 908. For example, the scheduling system 956 may determine handover data that indicates when communication is to be transferred from the first satellite 902(1) to the second satellite 902(2). Continuing the example, the scheduling system 956 may also specify communication parameters such as frequency, timeslot, and so forth. During operation, the scheduling system 956 may use information such as the orbital data 954, system status data 958, user terminal data 960, and so forth.

The system status data 958 may comprise information such as which UTs 908 are currently transferring data, satellite availability, current satellites 902 in use by respective UTs 908, capacity available at particular ground stations 906, and so forth. For example, the satellite availability may comprise information indicative of satellites 902 that are available to provide communication service or those satellites 902 that are unavailable for communication service. Continuing the example, a satellite 902 may be unavailable due to malfunction, previous tasking, maneuvering, and so forth. The system status data 958 may be indicative of past status, predictions of future status, and so forth. For example, the system status data 958 may include information such as projected data traffic for a specified interval of time based on previous transfers of user data 912. In another example, the system status data 958 may be indicative of future statuses, such as a satellite 902 being unavailable to provide communication service due to scheduled maneuvering, scheduled maintenance, scheduled decommissioning, and so forth.

The user terminal data 960 may comprise information such as a location of a particular UT 908. The user terminal data 960 may also include other information, such as a priority assigned to user data 912 associated with that UT 908, information about the communication capabilities of that particular UT 908, and so forth. For example, a particular UT 908 in use by a business may be assigned a higher priority relative to a UT 908 operated in a residential setting. Over time, different versions of UTs 908 may be deployed, having different communication capabilities, such as being able to operate at particular frequencies, supporting different signal encoding schemes, having different antenna configurations, and so forth.

The UT 908 includes a communication system 980 to establish communication with one or more satellites 902. The communication system 980 of the UT 908 may include components similar to those of the communication system 928 of a satellite 902 and may perform similar communication functionalities. For example, the communication system 980 may include one or more modems, digital signal processors, power amplifiers, antennas (including at least one antenna that implements multiple antenna elements, such as a phased array antenna), processors, memories, storage devices, communications peripherals, interface buses, and so forth. The UT 908 passes user data 912 between the constellation of satellites 902 and the user device 910. The user data 912 includes data originated by the user device 910 or addressed to the user device 910. The UT 908 may be fixed or in motion. For example, the UT 908 may be used at a residence or on a vehicle such as a car, boat, aerostat, drone, airplane, and so forth.

The UT 908 includes a tracking system 982. The tracking system 982 uses almanac data 984 to determine tracking data 986. The almanac data 984 provides information indicative of orbital elements of the orbit 904 of one or more satellites 902. For example, the almanac data 984 may comprise orbital elements such as "two-line element" data for the satellites 902 in the constellation that are broadcast or otherwise sent to the UTs 908 using the communication system 980.

The tracking system 982 may use the current location of the UT 908 and the almanac data 984 to determine the tracking data 986 for the satellite 902. For example, based on the current location of the UT 908 and the predicted position and movement of the satellites 902, the tracking system 982 can calculate the tracking data 986. The tracking data 986 may include information indicative of azimuth, elevation, distance to the second satellite, time of flight correction, or other information at a specified time. The determination of the tracking data 986 may be ongoing. For example, the first UT 908 may determine tracking data 986 every 1000 ms, every second, every five seconds, or at other intervals.

With regard to FIG. 9, an uplink is a communication link that can allow data to be sent to a satellite 902 from a ground station 906, UT 908, or a device other than another satellite 902. Uplinks are designated as UL1, UL2, UL3, and so forth. For example, UL1 is a first uplink from the ground station 906 to the second satellite 902(2). In comparison, a downlink is a communication link that can allow data to be sent from the satellite 902 to a ground station 906, UT 908, or device other than another satellite 902. For example, DL1 is a first downlink from the second satellite 902(2) to the ground station 906. The satellites 902 may also be in communication with one another. For example, a crosslink 990 provides for communication between satellites 902 in the constellation.

The satellite 902, the ground station 906, the user terminal 908, the user device 910, the management system 950, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 10:
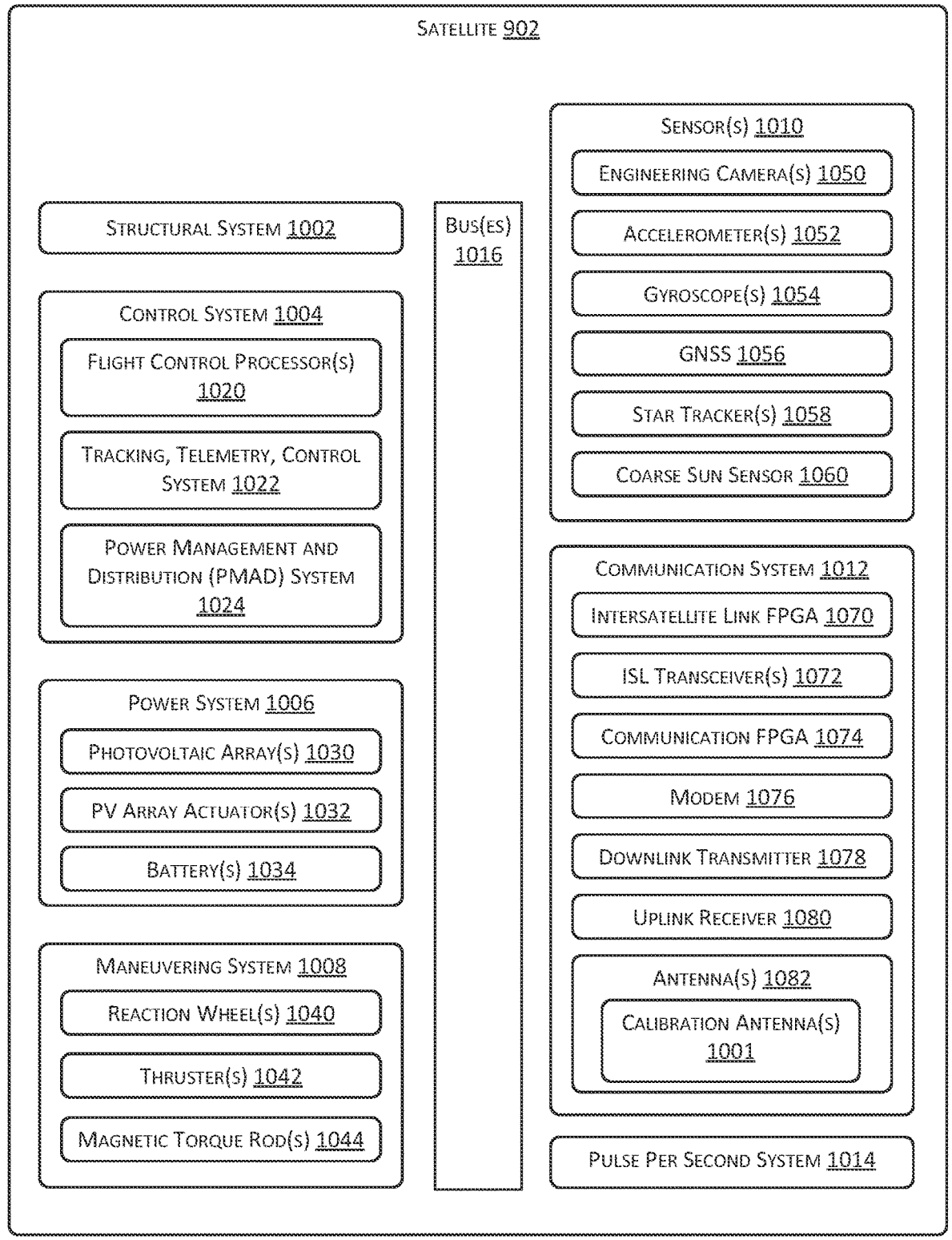
FIG. 10 is a functional block diagram of some systems associated with the satellite, according to some implementations.

FIG. 10 is a functional block diagram of some systems associated with the satellite 902, according to some implementations. The satellite 902 may comprise a structural system 1002, a control system 1004, a power system 1006, a maneuvering system 1008, one or more sensors 1010, and a communication system 1012. A pulse per second (PPS) system 1014 may be used to provide a timing reference to the systems onboard the satellite 902. One or more busses 1016 may be used to transfer data between the systems onboard the satellite 902. In some implementations, redundant busses 1016 may be provided. The busses 1016 may include, but are not limited to, data busses such as Controller Area Network Flexible Data Rate (CAN FD), Ethernet, Serial Peripheral Interface (SPI), and so forth. In some implementations, the busses 1016 may carry other signals. For example, a radio frequency bus may comprise a coaxial cable, waveguides, and so forth to transfer radio signals from one part of the satellite 902 to another. In other implementations, some systems may be omitted, or other systems added. One or more of these systems may be communicatively coupled with one another in various combinations.

The structural system 1002 comprises one or more structural elements to support the operation of the satellite 902. For example, the structural system 1002 may include trusses, struts, panels, and so forth. The components of other systems may be affixed to or housed by the structural system 1002. For example, the structural system 1002 may provide mechanical mounting and support for solar panels in the power system 1006. The structural system 1002 may also provide for thermal control to maintain components of the satellite 902 within operational temperature ranges. For example, the structural system 1002 may include louvers, heat sinks, radiators, and so forth.

The control system 1004 provides various services, such as operating the onboard systems, resource management, providing telemetry, processing commands, and so forth. For example, the control system 1004 may direct the operation of the communication system 1012. The control system 1004 may include one or more flight control processors 1020. The flight control processors 1020 may comprise one or more processors, FPGAs, and so forth. A tracking, telemetry, and control (TTC) system 1022 may include one or more processors, radios, and so forth. For example, the TTC system 1022 may comprise a dedicated radio transmitter and receiver to receive commands from a ground station 906, send telemetry to the ground station 906, and so forth. A power management and distribution (PMAD) system 1024 may direct the operation of the power system 1006, control distribution of power to the systems of the satellite 902, control battery 1034 charging, and so forth.

The power system 1006 provides electrical power to operate the components onboard the satellite 902. The power system 1006 may include components to generate electrical energy. For example, the power system 1006 may comprise one or more photovoltaic arrays 1030 comprising a plurality of photovoltaic cells, thermoelectric devices, fuel cells, and so forth. One or more PV array actuators 1032 may be used to change the orientation of the photovoltaic array(s) 1030 relative to the satellite 902. For example, the PV array actuator 1032 may comprise a motor. The power system 1006 may include components to store electrical energy. For example, the power system 1006 may comprise one or more batteries 1034, fuel cells, and so forth.

The maneuvering system 1008 maintains the satellite 902 in one or more of a specified orientation or orbit 904. For example, the maneuvering system 1008 may stabilize the satellite 902 with respect to one or more axes. In another example, the maneuvering system 1008 may move the satellite 902 to a specified orbit 904. The maneuvering system 1008 may include one or more reaction wheel(s) 1040, thrusters 1042, magnetic torque rods 1044, solar sails, drag devices, and so forth. The thrusters 1042 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 1006 to expel the water and produce thrust. During operation, the maneuvering system 1008 may use data obtained from one or more of the sensors 1010.

The satellite 902 includes one or more sensors 1010. The sensors 1010 may include one or more engineering cameras 1050. For example, an engineering camera 1050 may be mounted on the satellite 902 to provide images of at least a portion of the photovoltaic array 1030. Accelerometers 1052 provide information about the acceleration of the satellite 902 along one or more axes. Gyroscopes 1054 provide information about the rotation of the satellite 902 with respect to one or more axes. The sensors 1010 may include a global navigation satellite system (GNSS) 1056 receiver, such as a Global Positioning System (GPS) receiver, to provide information about the position of the satellite 902 relative to Earth. In some implementations, the GNSS 1056 may also provide information indicative of velocity, orientation, and so forth. One or more star trackers 1058 may be used to determine an orientation of the satellite 902. A coarse sun sensor 1060 may be used to detect the sun, provide information on the relative position of the sun with respect to the satellite 902, and so forth. The satellite 902 may include other sensors 1010 as well. For example, the satellite 902 may include a horizon detector, radar, lidar, and so forth.

The communication system 1012 provides communication with one or more other devices, such as other satellites 902, ground stations 906, user terminals 908, and so forth. The communication system 1012 may include one or more modems 1076, digital signal processors, power amplifiers, antennas 1082 (including at least one antenna that implements multiple antenna elements, such as a phased array antenna such as the antenna elements 148 of FIG. 1), processors, memories, storage devices, communications peripherals, interface buses, and so forth. Such components support communications with other satellites 902, ground stations 906 user terminals 908, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1012 may be output to other systems, such as the control system 1004, for further processing. Output from a system, such as the control system 1004, may be provided to the communication system 1012 for transmission.

The communication system 1012 may include hardware to support the intersatellite link 1090. For example, an intersatellite link FPGA 1070 may be used to modulate data sent and received by an ISL transceiver 1072 to send data between satellites 902. The ISL transceiver 1072 may operate using radio frequencies, optical frequencies, and so forth.

A communication FPGA 1074 may be used to facilitate communication between the satellite 902 and the ground stations 906, UTs 908, and so forth. For example, the communication FPGA 1074 may direct the operation of a modem 1076 to modulate signals sent using a downlink transmitter 1078 and demodulate signals received using an uplink receiver 1080. The satellite 902 may include one or more antennas 1082. For example, one or more parabolic antennas may be used to provide communication between the satellite 902 and one or more ground stations 906. In another example, a phased array antenna may be used to provide communication between the satellite 902 and the UTs 908.

Figure 11:
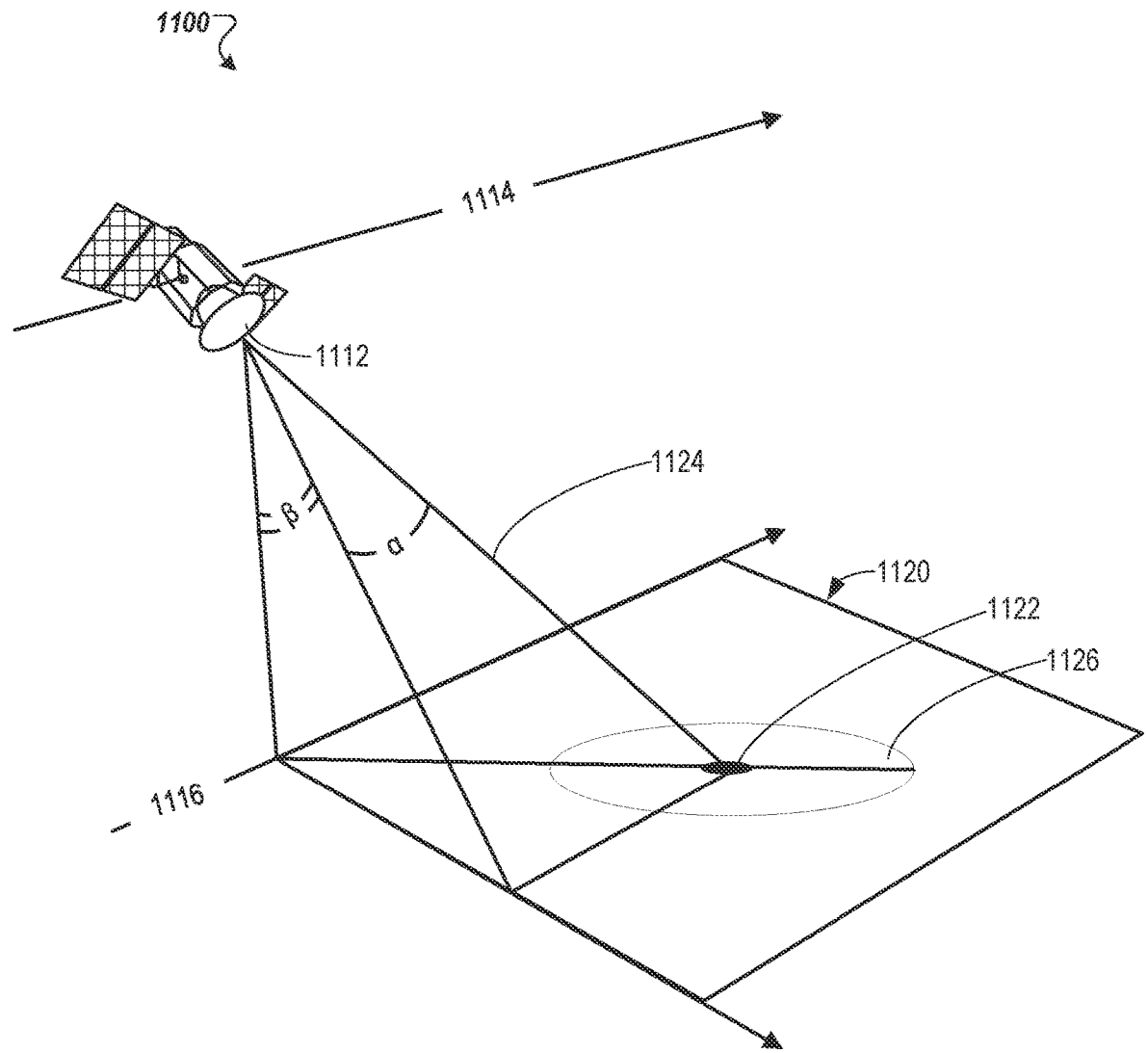
FIG. 11 illustrates a satellite including an antenna system that is steerable, according to embodiments of the present disclosure.

FIG. 11 illustrates the satellite 1100 including an antenna system 1112 that is steerable according to embodiments of the present disclosure. The satellite 1100 can include the communication system 100 or communication device 200 of FIGS. 1 and 2, as well as other array antennas and Tx DBF devices, as described herein. The antenna system 1112 may include multiple antenna elements that form an antenna and that can be mechanically or electrically steered individually, collectively, or a combination thereof. In an example, the antenna is a phased array antenna.

In orbit 904, the satellite 1100 follows a path 1114, the projection of which onto the surface of the Earth forms a ground path 1116. In the example illustrated in FIG. 12, the ground path 1116 and a projected axis extending orthogonally from the ground path 1216 at the position of the satellite 1100, together define a region 1120 of the surface of the Earth. In this example, the satellite 1100 can establish uplink and downlink communications with one or more of ground stations, user terminals, or other devices within the region 1120. In some embodiments, the region 1120 may be located in a different relative position to the ground path 1116 and the position of the satellite 1100. For example, the region 1120 may describe a region of the surface of the Earth directly below the satellite 1100. Furthermore, embodiments may include communications between the satellite 1100, an airborne communications system, and so forth.

As shown in FIG. 11, a communication target 1122 (e.g., a ground station, a user terminal, or a CT (such as an HD CT)) is located within the region 1120. The satellite 1100 controls the antenna system 1112 to steer transmission and reception of communications signals to selectively communicate with the communication target 1122. For example, in a downlink transmission from the satellite 1100 to the communication target 1122, a signal beam 1124 emitted by the antenna system 1112 is steerable within an area 1126 of the region 1120. In some implementations, the signal beam 1124 may include multiple subbeams. The extents of the area 1126 define an angular range within which the signal beam 1124 is steerable, where the direction of the signal beam 1124 is described by a beam angle "α" relative to a surface normal vector of the antenna system 1112. In two-dimensional phased array antennas, the signal beam 1124 is steerable in two dimensions, described in FIG. 11 by a second angle "β" orthogonal to the beam angle α. In this way, the area 1126 is a two-dimensional area within the region 1120, rather than a linear track at a fixed angle determined by the orientation of the antenna system 1112 relative to the ground path 1116.

In FIG. 11, as the satellite 1100 follows the path 1114, the area 1126 tracks along the surface of the Earth. In this way, the communication target 1122, which is shown centered in the area 1126 for clarity, is within the angular range of the antenna system 1112 for a period of time. During that time, signals communicated between the satellite 1100 and the communication target 1122 are subject to bandwidth constraints, including but not limited to signal strength and calibration of the signal beam 1124. In an example, for phased array antenna systems, the signal beam 1124 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 12:
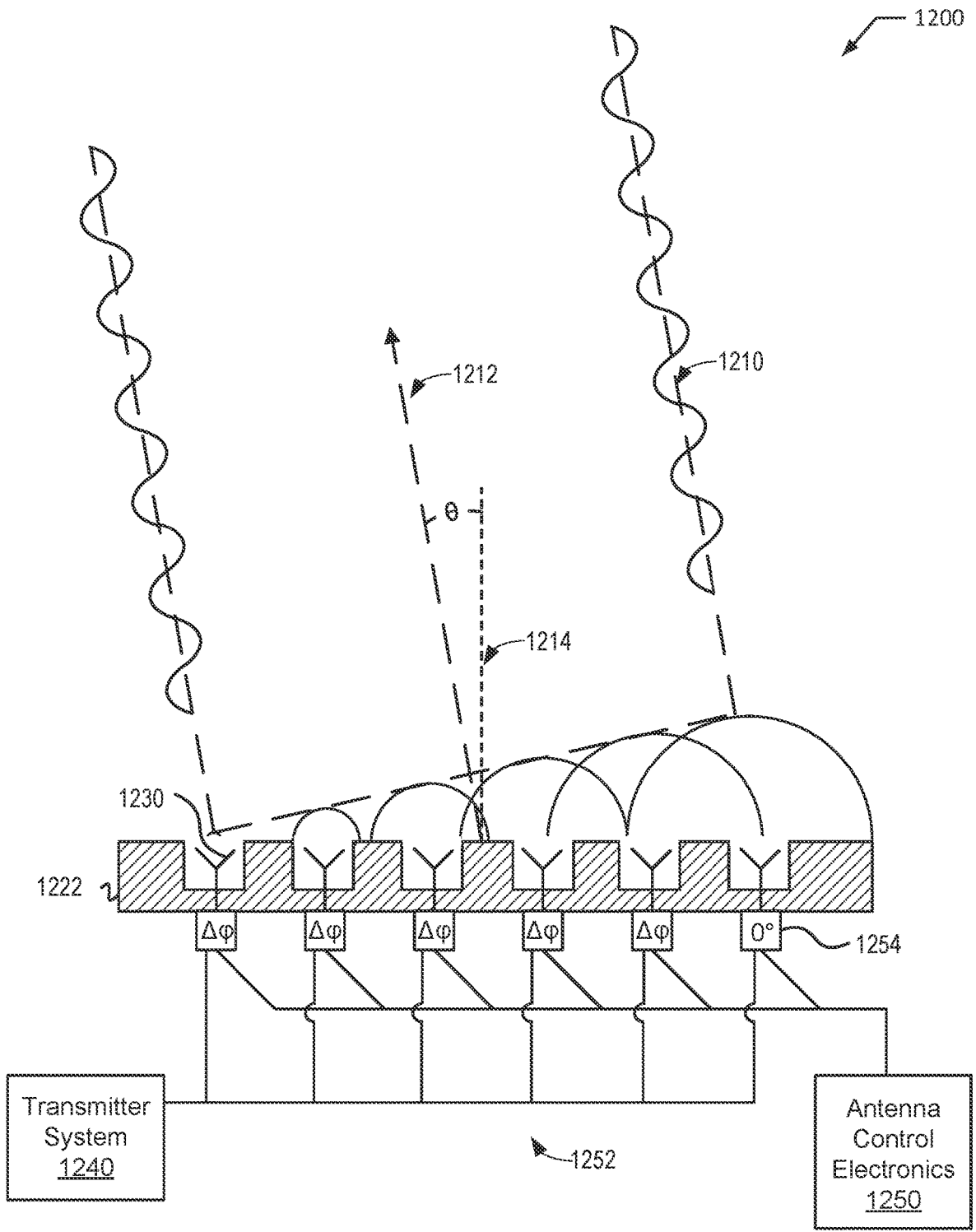
FIG. 12 illustrates a simplified schematic of an antenna, according to embodiments of the present disclosure.

FIG. 12 illustrates a simplified schematic of an antenna 1200, according to embodiments of the present disclosure. The antenna 1200 may be a component of the antenna system 1112 of FIG. 11. As illustrated, the antenna 1200 is a phased array antenna that includes multiple antenna elements 1230 (e.g., antenna elements 148 in FIG. 1). Interference between the antenna elements 1230 forms a directional radiation pattern in both transmitter and receiver arrays, forming a beam 1210 (beam extents shown as dashed lines). The beam 1210 is a portion of a larger transmission pattern (not shown) that extends beyond the immediate vicinity of the antenna 1200. The beam 1210 is directed along a beam vector 1212, described by an angle "θ" relative to an axis 1214 normal to a surface of the antenna 1200. As described below, the beam 1210 is one or more of steerable or shapeable through control of operating parameters including, but not limited to, a phase and an amplitude of each antenna element 1230.

In FIG. 12, the antenna 1200 includes, within a transmitter section 1222, the antenna elements 1230, which may include, but are not limited to, omnidirectional transmitter antennas coupled to a transmitter system 1240, such as the downlink transmitter 1078. The transmitter system 1240 provides a signal, such as a downlink signal to be transmitted to a ground station on the surface. The downlink signal is provided to each antenna element 1230 as a time-varying signal that may include several multiplexed signals. To steer the beam 1210 relative to the axis 1214, the phased array antenna system 1200 includes antenna control electronics 1250 controlling a radio frequency (RF) feeding network 1252, including multiple signal conditioning components 1354 interposed between the antenna elements 1230 and the transmitter system 1240. The signal conditioning components 1254 introduce one or more of a phase modulation or an amplitude modulation (e.g., by phase shifters 216 in FIG. 2), as denoted by "Δφ" in FIG. 12, to the signal sent to the antenna elements 1230.

The phase modulation imposed on each antenna element 1230 can differ and can be dependent on a spatial location of a communication target that determines an optimum beam vector (e.g., where the beam vector 1212 is found by one or more of maximizing signal intensity or connection strength). The optimum beam vector may change with time as the communication target 1122 moves relative to the phased array antenna system 1200.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
   receiving a first RF signal from a first source and a second RF signal from a second source that is different than the first source;
   generating first digital samples corresponding to the first RF signal using a first sampling rate;
   generating second digital samples corresponding to the first RF signal using a second sampling rate that is lower than the first sampling rate;
   generating third digital samples corresponding to the second RF signal using the second sampling rate;
   determining parameters associated with a filtering process using the second digital samples and the third digital samples;
   generating fourth digital samples using the parameters, wherein the fourth digital samples correspond to the first sampling rate; and
   removing a first portion from the first RF signal using the first digital samples and the fourth digital samples.

2. The method of claim 1, wherein the first RF signal comprises the first portion and a second portion, wherein the first portion corresponds to a first frequency band and the second portion corresponds to a second frequency band, wherein the second frequency band is included within the first frequency band.

3. The method of claim 2, wherein the fourth digital samples are generated by applying a bandpass filter to the determined parameters of the filtering process, wherein the bandpass filter corresponds to the second frequency band.

4. The method of claim 1, wherein:
   the second digital samples are generated by further applying a first frequency shift based on a frequency of the second RF signal; and
   the fourth digital samples are generated by further applying a second frequency shift, wherein the second frequency shift is associated with the first frequency shift.

5. The method of claim 1, wherein the first sampling rate is an integer multiple of the second sampling rate.

6. The method of claim 1, wherein the fourth digital samples are generated by upsampling a combination of samples of the third digital samples and interpolating corresponding parameters of the filtering process, wherein the method further comprises applying a time delay to the first digital samples, wherein combining the first digital samples with the fourth digital samples results in corresponding samples of the first digital samples being in phase with corresponding samples of the fourth digital samples.

7. The method of claim 1, further comprising:
   determining a radio frequency (RF) interference condition based on the first RF signal, wherein the RF interference condition is associated with an interfering device disposed along a first direction; and
   determining a modification to the filtering process based on the RF interference condition, wherein the modification corresponds to an update to a step size of one or more parameters of the determined parameters associated with the filtering process.

8. The method of claim 1, wherein the filtering process comprises at least one of coordinate descent logic, conjugate gradient logic, or dichotomous coordinate descent (DCD) logic.

9. The method of claim 1, wherein at least a portion of the first RF signal and the second RF signal correspond to a fixed-service transmission.

10. A communication device, comprising:
    radio frequency front end (RFFE) circuitry coupled to an array antenna;
    a memory coupled to the RFFE circuitry; and
    a controller coupled to the RFFE circuitry and the memory, wherein the controller:
    receives, using the RFFE circuitry, a first RF signal from a first source and a second RF signal from a second source that is different than the first source;
    generates first digital samples corresponding to the first RF signal using a first sampling rate;
    generates second digital samples corresponding to the first RF signal using a second sampling rate that is lower than the first sampling rate;
    generates third digital samples corresponding to the second RF signal using the second sampling rate;
    determines parameters associated with a filtering process using the second digital samples and the third digital samples;
    generates fourth digital samples using the parameters, wherein the fourth digital samples correspond to the first sampling rate; and
    removes a first portion from the first RF signal using the first digital samples and the fourth digital samples.

11. The communication device of claim 10, wherein the first RF signal comprises the first portion and a second portion, wherein the first portion corresponds to a first frequency band and the second portion corresponds to a second frequency band, wherein the second frequency band is included within the first frequency band.

12. The communication device of claim 11, wherein the fourth digital samples are generated by applying a bandpass filter to the determined parameters of the filtering process, wherein the bandpass filter corresponds to the second frequency band.

13. The communication device of claim 10, wherein:
the second digital samples are generated by further applying a first frequency shift based on a frequency of the second RF signal; and
the fourth digital samples are generated by further applying a second frequency shift, wherein the second frequency shift is associated with the first frequency shift.

14. The communication device of claim 10, wherein the first sampling rate is an integer multiple of the second sampling rate.

15. The communication device of claim 11, wherein the fourth digital samples are generated by upsampling a combination of samples of the third digital samples and interpolating corresponding parameters of the filtering process, wherein the controller further applies a time delay to the first digital samples, wherein combining the first digital samples with the fourth digital samples results in corresponding samples of the first digital samples being in phase with corresponding samples of the fourth digital samples.

16. The communication device of claim 10, wherein the controller further:
determines a radio frequency (RF) interference condition based on the first RF signal, wherein the RF interference condition is associated with an interfering device disposed along a first direction; and
determines a modification to the filtering process based on the RF interference condition, wherein the modification corresponds to an update to a step size of one or more parameters of the determined parameters associated with the filtering process.

17. The communication device of claim 10, wherein the filtering process comprises at least one of coordinate descent logic, conjugate gradient logic, or dichotomous coordinate descent (DCD) logic.

18. The communication device of claim 10, wherein at least a portion of the first RF signal and the second RF signal correspond to a fixed-service transmission.

19. A user terminal (UT), comprising:
beamforming circuitry coupled to an array antenna; and
a processing device coupled to the beamforming circuitry, wherein the processing device executes instructions to perform the following operations comprising:
receiving a first RF signal from a first source and a second RF signal from a second source that is different than the first source;
generating first digital samples corresponding to the first RF signal using a first sampling rate;
generating second digital samples corresponding to the first RF signal using a second sampling rate that is lower than the first sampling rate;
generating third digital samples corresponding to the second RF signal using the second sampling rate;
determining parameters associated with a filtering process using the second digital samples and the third digital samples;
generating fourth digital samples using the parameters, wherein the fourth digital samples correspond to the first sampling rate; and
removing a first portion from the first RF signal using the first digital samples and the fourth digital samples.

20. The UT of claim 19, further comprising a reference antenna coupled to the processing device, wherein the operations further comprise:
receiving second RF signal via the reference antenna, wherein the second RF signal is a reference RF signal corresponding to a second frequency band, wherein the third digital samples are generated by sampling the reference RF signal using the second sampling rate;
determining an RF interference condition based on the first RF signal, wherein the RF interference condition is associated with an interfering device disposed along a first direction; and
determining a modification to the filtering process based on the RF interference condition, wherein the modification corresponds to an update to a step size of a parameter of the filtering process.

* * * * *